United States Patent
Zhang et al.

(10) Patent No.: US 12,003,715 B2
(45) Date of Patent: *Jun. 4, 2024

(54) DEBLOCKING FILTER FOR VIDEO CODING

(71) Applicants: Beijing Bytedance Network Technology Co., Ltd., Beijing (CN); Bytedance Inc., Los Angeles, CA (US)

(72) Inventors: Li Zhang, San Diego, CA (US); Weijia Zhu, San Diego, CA (US); Kai Zhang, San Deigo, CA (US); Hongbin Liu, Beijing (CN); Jizheng Xu, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,905

(22) Filed: Sep. 28, 2022

(65) Prior Publication Data

US 2023/0032798 A1 Feb. 2, 2023

Related U.S. Application Data

(63) Continuation of application No. 17/523,131, filed on Nov. 10, 2021, which is a continuation of application No. PCT/CN2020/089557, filed on May 11, 2020.

(30) Foreign Application Priority Data

May 11, 2019 (WO) ................ PCT/CN2020/089557

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/159* (2014.11); *H04N 19/176* (2014.11); *H04N 19/82* (2014.11)

(58) Field of Classification Search
CPC .. H04N 19/117; H04N 19/132; H04N 19/159; H04N 19/176; H04N 19/82; H04N 19/14; H04N 19/86
(Continued)

(56) References Cited

U.S. PATENT DOCUMENTS

| | | | |
|---|---|---|---|
| 8,085,845 | B2 | 12/2011 | Tourapis et al. |
| 9,137,547 | B2 | 9/2015 | Van et al. |

(Continued)

FOREIGN PATENT DOCUMENTS

| | | | |
|---|---|---|---|
| CN | 101517909 A | 8/2009 | |
| CN | 103491373 A | 1/2014 | |

(Continued)

OTHER PUBLICATIONS

Extended European Search Report from European Application No. 20805536.8 dated May 16, 2022, 8 pages.
(Continued)

*Primary Examiner* — Matthew K Kwan
(74) *Attorney, Agent, or Firm* — Conley Rose, P.C.

(57) ABSTRACT

In an exemplary aspect, a method for visual media processing includes identifying a boundary at a vertical edge and/or a horizontal edge of two video blocks; calculating a boundary strength of a filter based on at least one of the two video blocks crossing a vertical edge or a horizontal edge is coded using a combined intra-inter prediction (CIIP) mode; deciding whether to turn on or off the filter; selecting a strength of the filter in case the filter is turned on; and performing, based on the selecting, a deblocking filter (DB) process to the video blocks.

20 Claims, 29 Drawing Sheets

(51) Int. Cl.
*H04N 19/159* (2014.01)
*H04N 19/176* (2014.01)
*H04N 19/82* (2014.01)

(58) Field of Classification Search
USPC .................................................. 375/240.02
See application file for complete search history.

(56) References Cited

U.S. PATENT DOCUMENTS

| | | | |
|---|---|---|---|
| 9,538,200 B2 | 1/2017 | Van et al. | |
| 9,723,331 B2 | 8/2017 | Van et al. | |
| 10,321,130 B2 | 6/2019 | Dong et al. | |
| 10,582,213 B2 | 3/2020 | Li et al. | |
| 10,708,591 B2 | 7/2020 | Zhang et al. | |
| 10,708,592 B2 | 7/2020 | Dong et al. | |
| 2012/0082219 A1 | 4/2012 | Sun et al. | |
| 2013/0107973 A1 | 5/2013 | Wang et al. | |
| 2013/0266061 A1 | 10/2013 | An et al. | |
| 2014/0169478 A1* | 6/2014 | Guo | H04N 19/117 375/240.12 |
| 2014/0321552 A1 | 10/2014 | He et al. | |
| 2014/0369428 A1 | 12/2014 | Park et al. | |
| 2015/0189329 A1 | 7/2015 | Wada | |
| 2019/0230353 A1 | 7/2019 | Gadde et al. | |
| 2019/0238845 A1 | 8/2019 | Zhang et al. | |
| 2019/0268594 A1* | 8/2019 | Lim | H04N 19/132 |
| 2020/0177910 A1 | 6/2020 | Li et al. | |
| 2020/0329238 A1* | 10/2020 | Choi | H04N 19/176 |
| 2020/0404258 A1* | 12/2020 | Wang | H04N 19/159 |
| 2021/0120239 A1 | 4/2021 | Zhu et al. | |
| 2021/0337239 A1 | 10/2021 | Zhang et al. | |
| 2021/0409699 A1* | 12/2021 | Andersson | H04N 19/61 |
| 2021/0409701 A1 | 12/2021 | Zhu et al. | |

FOREIGN PATENT DOCUMENTS

| | | | | |
|---|---|---|---|---|
| CN | 103931185 | A | 7/2014 | |
| CN | 104025590 | A | 9/2014 | |
| CN | 106464866 | A | 2/2017 | |
| CN | 107172423 | A | 9/2017 | |
| CN | 107925773 | A | 4/2018 | |
| KR | 20130090465 | A | 8/2013 | |
| WO | 2016043933 | A1 | 3/2016 | |
| WO | WO-2016043933 | A1 * | 3/2016 | H04N 19/105 |
| WO | 2018132043 | A1 | 7/2018 | |
| WO | 2018180841 | A1 | 10/2018 | |
| WO | 2020114513 | A1 | 6/2020 | |

OTHER PUBLICATIONS

Non-Final Office Action dated Feb. 10, 2022, 20 pages, U.S. Appl. No. 17/523,131, filed Nov. 10, 2021.
International Search Report and Written Opinion from International Application No. PCT/CN2020/089557 dated Aug. 13, 2020, 10 pages.
International Search Report and Written Opinion from International Application No. PCT/CN2020/089558 dated Aug. 11, 2020, 11 pages.
Foreign Communication From A Related Counterpart Application, Indian Application No. 202127051733, Indian Office Action dated May 17, 2022, 7 pages.
Document: JVET-M0471, Ikeda, M., et al. "CE11.1.6, CE11.1.7 and CE11.1.8: Joint proposals for long deblocking from Sony, Qualcomm, Sharp, Ericsson," Joint Video Experts Team (JVET) of ITU-T SG 16 WP 3 and ISO/IEC JTC 1/SC 29/WG 11 13th Meeting: Marrakesh, MA, Jan. 9-18, 2019, 11 pages.
Document: JVET-M0102-v5, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 9 pages.

Document: JVET-N0217, Pfaff, J., "CE3: Affine linear weighted intra prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, 17 pages.
Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 19 pages.
Document: JVET-K0099, Salehifar, M., et al., "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, 12 pages.
Document: JVET-L0133, Koo, M., et al., "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.
Document: JVET-N0054, Lainema, J., "CE7: Joint coding of chrominance residuals (CE7-1)," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Document: JVET-N0236-r5, Luo, J., et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19-27, 2019, 8 pages.
"Information technology—High efficiency coding and media delivery iin heterogeneous environments—Part 2: High Efficiency Video Coding," ISO/IEC JTC 1/SC 29/WG 11 N 17661, Rec. ITU-T H.265 | ISO/IEC 23008-2:201x (4th Ed.), Apr. 20, 2018, 8 pages.
Document: JCTVC-Y1002, Rosewarne, C., et al,. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, 64 pages.
JVET-G1001-v1, Chen, J., et al., "Algorithm description of Joint Exploration Test Model 7 (JEM7)" Joint Video Experts Team (JVET) of ITU-T SG 16 WP 3 and ISO/IEC JTC 1/SC 29/WG 11, 7th Meeting: Torino, IT, Jul. 13-21, 2017, 46 pages.
JEM-7.0: https://jvet.hhi.fraunhofer.de/svn/svn_HMJEMSoftware/ tags/ HM-16.6-JEM-7.0. Dec. 27, 2022, 1 page.
Document: JVET-L0124-v2, Liao, R., et al., "CE10.3.1.b: Triangular prediction unit mode," Joint Video Exploration Team (JVET) of ITU-T SG 16 WP 3 and ISO/IEC JTC 1/SC 29/WG 11 12th Meeting: Macao, CN, Oct. 3-12, 2018, 8 pages.
Document: JVET-L0368-v2, Chen et al., "CE4: Affine merge enhancement with simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, 7 pages.
Document: JVET-E0032, Strom, J., et al., "Bilateral filter strength based on prediction mode," Joint Video Exploration Team (JVET) of ITU-T SG 16 WP 3 and ISO/IEC JTC 1/SC 29/WG 11 5th Meeting: Geneva, CH, Jan. 12-20, 2017, 3 pages.
Document: JVET-N0314-v2, Sethuraman, S., "CE9-related: Results for use of DMVR refined MVs from top and top-left CTUs for spatial MV prediction and CU boundary de-blocking," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
JVET-N0359_r1, Andersson et al., "CE11-related: On MV Threshold for Deblocking," Joint Video Experts Team (JVET) of ITU-T SG 16 WP 3 and ISO/IEC JTC 1/SC 29/WG 11, 14th Meeting: Geneva, CH, Mar. 19-27, 2019, 5 pages.
Document: JVET-L0369, Chen, et al., "CE4: Separate list for sub-block merge candidates (Test 4.2.8)," Joint Video Experts Team (JVET) of ITU-T SG 16 WP 3 and ISO/IEC JTC 1/SC 29/WG 11, 12th Meeting: Macao, CN, Oct. 3-12, 2018, 5 pages.
Document JVET-M0294, Wang et al., "CE10-related: modification for blocks applied with combined inter-intra prediction," Joint Video Experts Team (JVET) of ITU-T SG 16 WP 3 and ISO/IEC JTC 1/SC 29/WG 11, 13th Meeting: Marrakesh, MA, Jan. 9-18, 2019, 6 pages.
Document: JVET-M1002-v1, Chen, et al., "Algorithm description for Versatile Video Coding and Test Model 4 (VTM 4)," Joint Video

(56) References Cited

OTHER PUBLICATIONS

Experts Team (JVET) of ITU-T SG 16 WP 3 and ISO/IEC JTC 1/SC 29/WG 11, 13th Meeting: Marrakech, MA, Jan. 9-18, 2019, 63 pages.
Document: JVET-M0103-v1, Andersson, K., et al., "Deblocking for multi-hypothesis intra inter prediction," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.
Examination Report from Indian Patent Application No. 202127051733 dated May 17, 2022, 7 pages.
Document: JVET-P0062, Andersson, K., et al., "CE5-1.1.1: DMVR deblocking, CE5-1.1.2: DMVR restricted deblocking and CE5-1.1.3: DMVR off", Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Document: JVET-P0547, Unno, K., et al., "Non-CE5: Deblocking filter at PROF sub-block boundary," Joint Video Experts Team(JVET) of ITU-T SG 16 WP 3 and ISO/IEC JTC 1/SC 29/WG 11 16 th Meeting: Geneva, CH, Oct. 1-11, 2019, 8 pages.
Document: JVET-N1001-v4, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 384 pages.
European Office Action from European Application No. 20805536.8 dated Feb. 21, 2024, 7 pages.

\* cited by examiner

FIG. 5

DEBLOCKING FILTER FOR VIDEO CODING

CROSS REFERENCE TO RELATED APPLICATIONS

This application is a continuation of U.S. application Ser. No. 17/523,131, filed on Nov. 10, 2021, which is a continuation of International Patent Application No. PCT/CN2020/089557, filed on May 11, 2020, which claims the priority to and benefit of International Patent Application No. PCT/CN2019/086488, filed on May 11, 2019. For all purposes under the law, the entire disclosure of the aforementioned application is incorporated by reference as part of the disclosure of this application.

TECHNICAL FIELD

This patent document relates to video coding/decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to video coding/decoding technologies, and specifically, to deblocking filter in image/video coding are described. The described methods may be applied to the standard under development, e.g. Versatile Video Coding and future video coding standards or video codec.

In one aspect, the disclosed embodiments may be used to provide a method for visual media processing. This method includes identifying a boundary at a vertical edge and/or a horizontal edge of two video blocks; calculating a boundary strength of a filter based on at least one of the two video blocks crossing a vertical edge or a horizontal edge is coded using a combined intra-inter prediction (CIIP) mode; deciding whether to turn on or off the filter; selecting a strength of the filter in case the filter is turned on; and performing, based on the selecting, a deblocking filter (DB) process to the video blocks.

In another aspect, the disclosed embodiments may be used to provide a method for visual media processing. This method includes making a determination of a coding scheme applicable to a conversion between a video block of visual media data and a bitstream representation of the video block; and based on the determination of the coding scheme, selectively enabling or disabling application of an in-loop filter to the video block during a conversion of the video block.

In yet another aspect, the disclosed embodiments may be used to provide a method for visual media processing. This method includes making a determination of a type of transform matrix applicable to a conversion between a video block of visual media data and a bitstream representation of the video block; and based on the determination of the type of transform matrix, selectively enabling or disabling application of a deblocking (DB) filter process to the video block during a conversion of the video block.

In yet another aspect, the disclosed embodiments may be used to provide a method for visual media processing. This method includes during a conversion between a video block of visual media data and a bitstream representation of the video block, determining application of an in-loop filtering step to the video block, wherein the in-loop filtering step includes a clipping operation applied on samples in the video block to be filtered; and selectively enabling or disabling the clipping operation, in response to determining one or more conditions associated with the video block.

In yet another aspect, the above-described method is embodied in the form of processor-executable code and stored in a computer-readable program medium.

In yet another aspect, a device that is configured or operable to perform the above-described method is disclosed. The device may include a processor that is programmed to implement this method.

In yet another aspect, a video decoder apparatus may implement a method as described herein.

In yet another aspect, a video encoder apparatus may implement a method as described herein.

The above and other aspects and features of the disclosed embodiments are described in greater detail in the drawings, the description and the claims.

BRIEF DESCRIPTION OF THE DRAWINGS

FIG. 5 shows examples of the pixels involved in a filter on/off decision.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or Moving Picture Experts Group (MPEG)-H Part 2), the Versatile Video Coding (VVC) standard to be finalized, or other current and/or future video coding standards.

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

Embodiments of the present disclosure may be applied to existing video coding standards (e.g., HEVC, H.265) and future standards to improve runtime performance. The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document to improve readability of the description and do not in any way limit the discussion or the embodiments (and/or implementations) to the respective sections only.

1 Examples of Coding Flow of a Typical Video Codec

Figure 1:
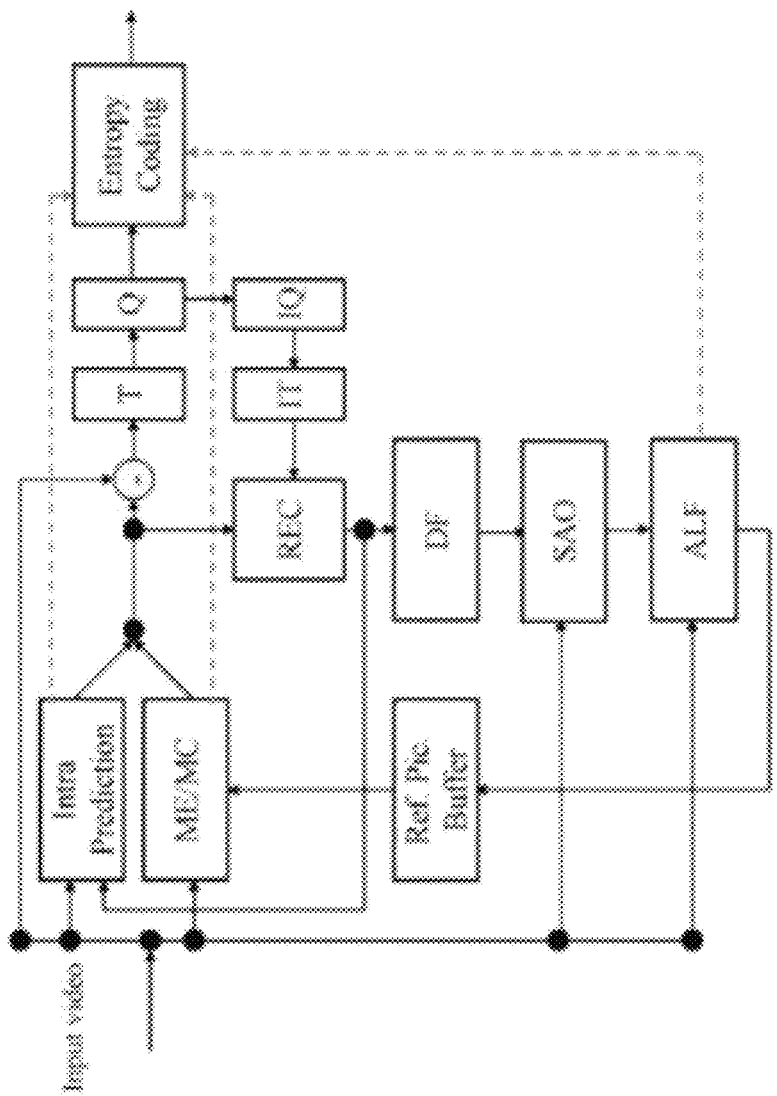
FIG. 1 shows an example of encoder block diagram of versatile video coding (VVC).

FIG. 1 shows an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2 Examples of Deblocking Scheme in HEVC

A deblocking filter process is performed for each coding unit (CU) in the same order as the decoding process. First, vertical edges are filtered (horizontal filtering), then horizontal edges are filtered (vertical filtering). Filtering is applied to 8×8 block boundaries which are determined to be filtered, for both luma and chroma components. 4×4 block boundaries are not processed in order to reduce the complexity.

Figure 2:
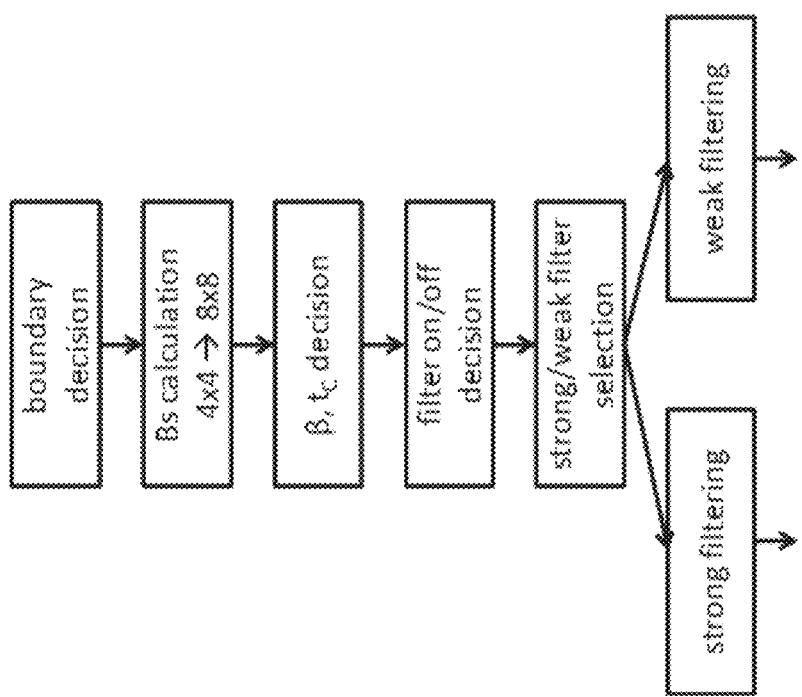
FIG. 2 shows an example processing flow of deblocking filter process.

FIG. 2 illustrates the overall processing flow of deblocking filter process. A boundary can have three filtering status: no filtering, weak filtering and strong filtering. Each filtering decision is based on boundary strength, Bs, and threshold values, $\beta$ and $t_C$.

2.1 Boundary Decision

Three kinds of boundaries may be involved in the filtering process: CU boundary, transform unit (TU) boundary and picture unit (PU) boundary. CU boundaries, which are outer edges of CU, are always involved in the filtering since CU boundaries are always also TU boundaries or PU boundaries. When PU shape is 2N×N (N>4) and RQT depth is equal to 1, TU boundary at 8×8 block grid and PU boundary between each PU inside CU are involved in the filtering. One exception is that when the PU boundary is inside the TU, the boundary is not filtered.

2.2 Boundary Strength Calculation

Figure 3:
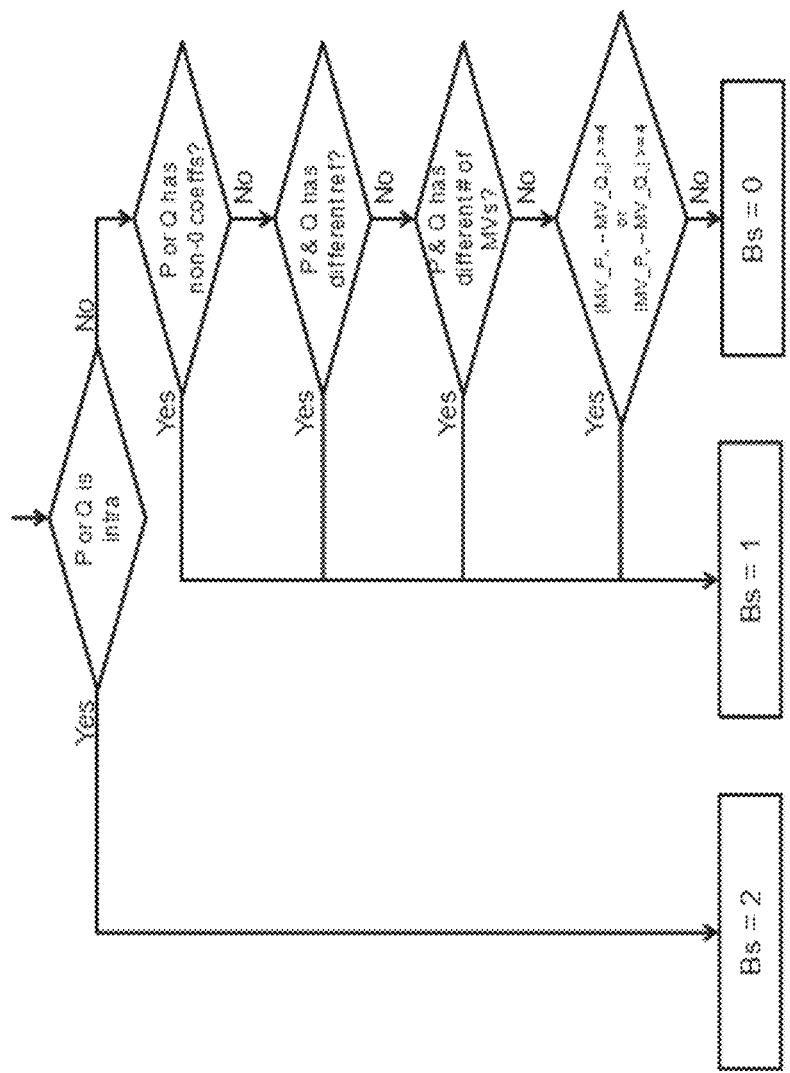
FIG. 3 shows how the boundary strength (Bs) value is calculated based on the intra coding mode, existence of non-zero transform coefficients and motion information, reference picture, number of motion vectors and motion vector difference.

FIG. 3 illustrates a flow chart for Bs calculation. Generally speaking, boundary strength (Bs) reflects how strong of filtering is needed for the boundary. If Bs is large, strong filtering should be considered. Let P and Q be defined as blocks which are involved in the filtering, where P represents the block located in left (vertical edge case) or above (horizontal edge case) side of the boundary and Q represents the block located in right (vertical edge case) or above (horizontal edge case) side of the boundary. FIG. 3 illustrates how the Bs value is calculated based on the intra coding mode, existence of non-zero transform coefficients and motion information, reference picture, number of motion vectors and motion vector difference.

Bs is calculated on a 4×4 block basis, but it is re-mapped to an 8×8 grid. The maximum of the two values of Bs which correspond to 8 pixels consisting of a line in the 4×4 grid is selected as the Bs for boundaries in the 8×8 grid.

Figure 4:
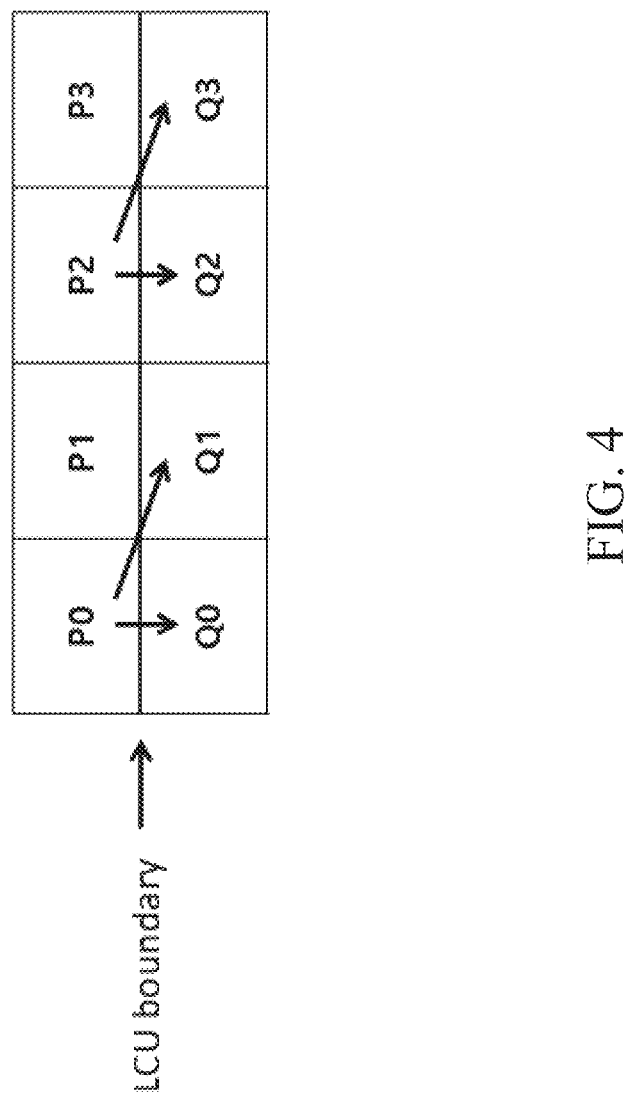
FIG. 4 shows an example of referred information for Bs calculation at a coding tree unit (CTU) boundary.

FIG. 4 shows an example of referred information for Bs calculation at CTU boundary. In order to reduce line buffer memory requirement, only for CTU boundary, information in every second block (4×4 grid) in left or above side is re-used as depicted in FIG. 4.

2.3 β and $t_C$ Decision

Threshold values β and $t_C$ which are involved in filter on/off decision, strong and weak filter selection, and weak filtering process are derived based on luma quantization parameter (QP) of P and Q blocks, $QP_P$ and $QP_Q$, respectively. Q used to derive β and $t_C$ is calculated as follows.

$$Q=((QP_P+QP_Q+1)>>1).$$

A variable 13 is derived as shown in Table 1, based on Q. If Bs is greater than 1, the variable $t_C$ is specified as Table 1 with Clip3(0, 55, Q+2) as input. Otherwise (BS is equal or less than 1), the variable $t_C$ is specified as Table 1 with Q as input.

TABLE 1

Derivation of threshold variables β and tC from input Q

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β | 0 | 0 | 0 | 0 | 0 | 0 | 0 | 0 | 0 | 0 | 0  | 0  | 0  | 0  | 0  | 0  | 6  | 7  | 8  |
| $t_C$ | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| β | 9  | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 2 | 2 | 2 | 2 | 3 | 3 | 3 | 3 | 4 | 4 | 4 |

| Q | 38 | 39 | 40 | 41 | 42 | 43 | 44 | 45 | 46 | 47 | 48 | 49 | 50 | 51 | 52 | 53 | 54 | 55 |
|---|----|----|----|----|----|----|----|----|----|----|----|----|----|----|----|----|----|----|
| β | 38 | 40 | 42 | 44 | 46 | 48 | 50 | 52 | 54 | 56 | 58 | 60 | 62 | 64 | 64 | 64 | 64 | 64 |
| $t_C$ | 5 | 5 | 6 | 6 | 7 | 8 | 9 | 9 | 10 | 10 | 11 | 11 | 12 | 12 | 13 | 13 | 14 | 14 |

2.4 Filter on/Off Decision for Each 4 Lines

Figure 5:
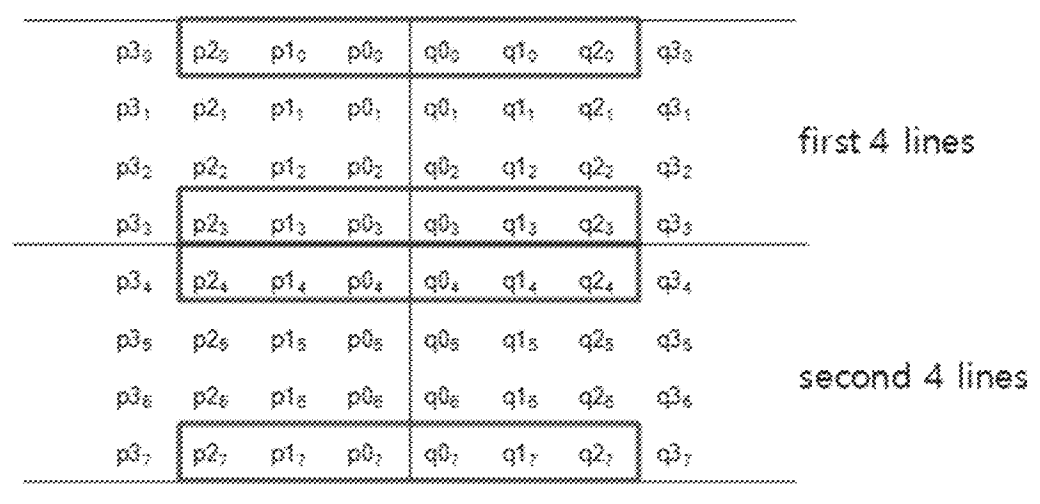

FIG. 5 shows examples of the pixels involved in the filter on/off decision. Note that, in the following descriptions, pNM denotes the left-side N-th sample in the M-th row relative to the vertical edge or the top-side N-th sample in the M-th column relative to the horizontal edge, qNM denotes the right-side N-th sample in the M-th row relative to the vertical edge or the bottom-side N-th sample in the M-th column relative to the horizontal edge. An example of pNM and qNM is depicted in FIG. 5.

Note that, in the following descriptions, pN denotes the left-side N-th sample in a row relative to the vertical edge or the top-side N-th sample in a column relative to the horizontal edge, qN denotes the right-side N-th sample in a row relative to the vertical edge or the bottom-side N-th sample in a column relative to the horizontal edge.

Filter on/off decision is done for four lines as a unit. FIG. 5 illustrates the pixels involved in the filter on/off decision. The 6 pixels in the two boxes for the first four lines are used to determine filter on/off for 4 lines. The 6 pixels in two boxes for the second 4 lines are used to determine filter on/off for the second four lines.

If dp0+dq0+dp3+dq3<β, filtering for the first four lines is turned on and strong/weak filter selection process is applied. Each variable is derived as follows.

$$dp0=|p2_0-2*p1_0+p0_0|,$$

$$dp3=|p2_3-2*p1_3+p0_3|,$$

$$dp4=|p2_4-2*p1_4+p0_4|,$$

$$dp7=|p2_7-2*p1_7+p0_7|,$$

$$dq0=|q2_0-2*q1_0+q0_0|,$$

$$dq3=|q2_3-2*q1_3+q0_3|,$$

$$dq4=|q2_4-2*q1_4+q0_4|, \text{ and}$$

$$dq7=|q2_7-2*q1_7+q0_7|$$

If the condition is not met, no filtering is done for the first 4 lines. Additionally, if the condition is met, dE, dEp1 and dEp2 are derived for weak filtering process. The variable dE is set equal to 1. If dp0+dp3<(β+((β>>1))>>3, the variable dEp1 is set equal to 1. If dq0+dq3<(β+((β>>1))>>3, the variable dEq1 is set equal to 1. For the second four lines, a decision is made in a same fashion as above.

2.5 Strong/Weak Filter Selection for 4 Lines

After the first four lines are checked to decide the filter is enabled, and if the following two conditions are met, strong filter is used for filtering of the first four lines. Otherwise, weak filter is used for filtering. Involved pixels are same with those used for filter on/off decision as depicted in FIG. 5.

$$2*(dp0+dq0)<(β((β>>2),|p3_0-p0_0|+|q0_0-q3_0|<((β>>3) \text{ and } |p0_0-q0_0|<(5*t_C+1)>>1$$

$$2*(dp3+dq3)<((β>>2),|p3_3-p0_3|+|q0_3-q3_3|<((β>>3) \text{ and } |p0_3-q0_3|<(5*t_C+1)>>1$$

Similarly, if the following two conditions are met, strong filter is used for filtering of the second 4 lines. Otherwise, weak filter is used for filtering.

$$2*(dp4+dq4)<((β>>2),|p3_4-p0_4|+|q0_4-q3_4|<(β>>3) \text{ and } |p0_4-q0_4|<(5*t_C+1)>>1$$

$$2*(dp7+dq7)<((β>>2),|p3_7-p0_7|+|q0_7-q3_7|<((β>>3) \text{ and } p0_7-q0_7|<(5*t_C+1)>>1$$

2.5.1 Strong Filtering

For strong filtering, filtered pixel values are obtained by the following equations. It is noted that three pixels are modified using four pixels as an input for each P and Q block, respectively.

$$p_0'=(p_2+2*p_1+2*p_0+2*q_0+q_1+4)>>3$$

$$q_0'=(p_1+2*p_0+2*q_0+2*q_1+q_2+4)>>3$$

$$p_1'=(p_2+p_1+p_0+q_0+2)<<2$$

$$q_1'=(p_0+q_0+q_1+q_2+2)>>2$$

$$p_2'=(2*p_3+3*p_2+p_1+p_0+q_0+4)>>3$$

$$q_2'=(p_0+q_0+q_1+3*q_2+2*q_3+4)>>3$$

2.5.2 Weak Filtering

The symbol Δ may be defined as follows.

$$\Delta=(9*(q_0-p_0)-3*(q_1-p_1)+8)>>4$$

When abs(Δ) is less than $t_C*10$, $$\Delta=Clip3(-t_C,t_C,\Delta)$$

$$p_0'=Clip1_Y(p_0+\Delta)$$

$$q_0'=Clip1_Y(q_0-\Delta)$$

If dEp1 is equal to 1, $$\Delta p=Clip3(-(t_C>>1),t_C>>1,(((p_2+p_0+1)>>1)-p_1+\Delta)>>1)$$

$$p_1'=Clip1_Y(p_1+\Delta p)$$

If dEq1 is equal to 1, $$\Delta q=Clip3(-(t_C>>1),t_C>>1,(((q_2+q_0+1)>>1)-q_1-\Delta)>>1)$$

$$q_1'=Clip1_Y(q_1+\Delta q)$$

It is worth noting that a maximum of two pixels are modified using three pixels as an input for each P and Q block, respectively.

2.5.3 Chroma Filtering

Bs of chroma filtering is inherited from luma. If Bs>1 or if coded chroma coefficient existing case, chroma filtering is performed. No other filtering decision is there. And only one filter is applied for chroma. No filter selection process for chroma is used. The filtered sample values p0' and q0' are derived as follows.

$$\Delta=Clip3(-t_C,t_C,((((q_0-p_0)<<2)+p_1-q_1+4)>>3))$$

$$p_0'=Clip1_C(p_0+\Delta)$$

$$q_0'=Clip1_C(q_0-\Delta)$$

3 Examples of Deblocking Scheme in VVC Test Model (VTM)-4.0

In the current VTM, i.e., VTM-4.0, the deblocking scheme described in Joint Video Exploration Team (JVET)-M0471 is used. The vertical edges in a picture are filtered first. Then the horizontal edges in a picture are filtered with samples modified by the vertical edge filtering process as input. The vertical and horizontal edges in the coding tree blocks (CTBs) of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

3.1 Boundary Decision

Filtering is applied to 8×8 block boundaries. In addition, it must be a transform block boundary or a coding subblock boundary (e.g., due to usage of Affine motion prediction, ATMVP). For those which are not such boundaries, filtering is disabled.

3.2 Boundary Strength Calculation

For a transform block boundary/coding subblock boundary, if it is located in the 8×8 grid, it may be filtered and the setting of $bS[xD_i][yq_j]$ (wherein $[xD_i][yq_j]$ denotes the coordinate) for this edge is defined as follows:

If the sample $p_0$ or $q_0$ is in the coding block of a coding unit coded with intra prediction mode, $bS[xD_i][yq_j]$ is set equal to 2.

Otherwise, if the block edge is also a transform block edge and the sample $p_0$ or $q_0$ is in a transform block which contains one or more non-zero transform coefficient levels, $bS[xD_i][yq_j]$ is set equal to 1.

Otherwise, if the prediction mode of the coding subblock containing the sample $p_0$ is different from the prediction mode of the coding subblock containing the sample $q_0$, $bS[xD_i][yq_j]$ is set equal to 1.

Otherwise, if one or more of the following conditions are true, $bS[xD_i][yq_j]$ is set equal to 1:

The coding subblock containing the sample $p_0$ and the coding subblock containing the sample $q_0$ are both coded in intra block copy (IBC) prediction mode, and the absolute difference between the horizontal or vertical component of the motion vectors used in the prediction of the two coding subblocks is greater than or equal to 4 in units of quarter luma samples.

For the prediction of the coding subblock containing the sample p0 different reference pictures or a different number of motion vectors are used than for the prediction of the coding subblock containing the sample $q_0$.

NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample p0 and one motion vector is used to predict the coding subblock containing the sample q0, and the absolute difference between the horizontal or vertical component of the motion vectors used is greater than or equal to 4 in units of quarter luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.

Otherwise, the variable $bS[xD_i][yD_j]$ is set equal to 0.

Table 2 and Table 3 summarize the BS calculation rules.

TABLE 2

Boundary strength (when sequence parameter set (SPS) IBC is disabled)

| Priority | Conditions | Y | U | V |
|---|---|---|---|---|
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 3

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

3.3 Deblocking Decision for Luma Component

The deblocking decision process is described in this sub-section. Wider-stronger luma filters are used only if all of the Condition1, Condition2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

```
bSidePisLargeBlk=((edge type is vertical and p₀
    belongs to CU with width>=32)||(edge type is
    horizontal and p₀ belongs to CU with
    height>=32))?TRUE:FALSE bSideQisLargeBlk=((edge type is vertical and q₀
    belongs to CU with width>=32)||(edge type is
    horizontal and q₀ belongs to CU with
    height>=32))?TRUE:FALSE
```

Based on bSidePisLargeBlk and bSideQisLargeBlk, the condition 1 is defined as follows.

```
Condition1=(bSidePisLargeBlk||bSidePisLargeBlk)?
    TRUE:FALSE
```

Next, if Condition 1 is true, the condition 2 will be further checked. First, the following variables are derived:
dp0, dp3, dq0, dq3 are first derived as in HEVC
if (p side is greater than or equal to 32)

$$dp0=(dp0+Abs(p5_0-2*p4_0+p3_0)+1)>>1$$

$$dp3=(dp3+Abs(p5_3-2*p4_3+p3_3)+1)>>1$$

if (q side is greater than or equal to 32)

$$dq0=(dq0+Abs(q5_0-2*q4_0+q3_0)+1)>>1$$

$$dq3=(dq3+Abs(q5_3-2*q4_3+q3_3)+1)>>1$$

Condition2=(d<β)?TRUE:FALSE where d=dp0+dq0+dp3+dq3, as shown in section 2.4.

If Condition1 and Condition2 are valid, whether any of the blocks uses sub-blocks is further checked:

```
If (bSidePisLargeBlk)
    If (mode block P == SUBBLOCKMODE)
        Sp =5
    else
        Sp =7
else
    Sp = 3
If (bSideQisLargeBlk)
    If (mode block Q == SUBBLOCKMODE)
        Sq =5
    else
        Sq =7
else
    Sq = 3
```

Finally, if both the Condition 1 and Condition 2 are valid, the proposed deblocking method will check the condition 3 (the large block strong filter condition), which is defined as follows.

In the Condition3 StrongFilterCondition, the following variables are derived: dpq is derived as in HEVC.

```
sp₃ = Abs( p₃ - p₀ ), derived as in HEVC
if (p side is greater than or equal to 32)
    if(Sp==5)
        sp₃ = ( sp₃ + Abs( p₅ - p₃ ) + 1 ) >> 1
    else
        sp₃ = ( sp₃ + Abs( p₇ - p₃ ) + 1 ) >> 1
sq₃ = Abs( q₀ - q₃ ), derived as in HEVC
if (q side is greater than or equal to 32)
    If(Sq==5)
        sq₃ = ( sq₃ + Abs( q₅ - q₃ ) + 1 ) >> 1
    else
        sq₃ = ( sq₃ + Abs( q₇ - q₃ ) + 1 ) >> 1
```

As in HEVC, StrongFilterCondition=(dpq is less than (β>>2), sp3+sq3 is less than (3*β>>5), and Abs(p0-q0) is less than (5*$t_C$+1)>>1)? TRUE:FALSE

3.4 Stronger Deblocking Filter for Luma (Designed for Larger Blocks)

Bilinear filtering is used when samples at either one side of a boundary belong to a large block. A sample belonging to a large block is defined as when the width >=32 for a vertical edge, and when height >=32 for a horizontal edge. The bilinear filter is listed below.

Block boundary samples pi for i=0 to Sp−1 and qi for j=0 to Sq−1 (pi and qi are the i-th sample within a row for filtering vertical edge (or the i-th sample within a column for filtering horizontal edge) in HEVC deblocking described above) are then replaced by linear interpolation as follows:

$$p_i'=(f_i*Middle_{s,t}+(64-f_i)*P_s+32)>>6), \text{clipped to } p_i \pm tcPD_i$$

$$q_j'=(g_j*Middle_{s,t}+(64-g_j)*Q_s+32)>>6), \text{clipped to } q_j \pm tcPD_j$$

where {tcPD}_i and {tcPD}_j term is a position dependent clipping described in Section 3.6 and g_j, f_i, {Middle}_{s, t}, P_s and Q_s are given below:

TABLE 4

| | |
|---|---|
| Sp, Sq 7, 7 (p side: 7, q side: 7) | $f_i = 59 - i * 9$, can also be described as f = {59, 50, 41, 32, 23, 14, 5} <br> $g_j = 59 - j * 9$, can also be described as g = {59, 50, 41, 32, 23, 14, 5} <br> $Middle_{7,7} = (2 * (p_o + q_o) + p_1 + q_1 + p_2 + q_2 + p_3 + q_3 + p_4 + q_4 + p_5 + q_5 + p_6 + q_6 + 8) >> 4$ <br> $P_7 = (p_6 + p_7 + 1) >> 1, Q_7 = (q_6 + q_7 + 1) >> 1$ |
| 7, 3 (p side: 7 q side: 3) | $f_i = 59 - i * 9$, can also be described as f = {59, 50, 41, 32, 23, 14, 5} <br> $g_j = 53 - j * 21$, can also be described as g = {53, 32, 11} <br> $Middle_{7,3} = (2 * (p_o + q_o) + q_0 + 2 * (q_1 + q_2) + p_1 + q_1 + p_2 + p_3 + p_4 + p_5 + p_6 + 8) >> 4$ <br> $P_7 = (p_6 + p_7 + 1) >> 1, Q_3 = (q_2 + q_3 + 1) >> 1$ |
| 3, 7 (p side: 3 q side: 7) | $g_j = 59 - j * 9$, can also be described as g = {59, 50, 41, 32, 23, 14, 5} <br> $f_i = 53 - i * 21$, can also be described as f = {53, 32, 11} <br> $Middle_{3,7} = (2 * (q_o + p_o) + p_0 + 2 * (p_1 + p_2) + q_1 + p_1 + q_2 + q_3 + q_4 + q_5 + q_6 + 8) >> 4$ <br> $Q_7 = (q_6 + q_7 + 1) >> 1, P_3 = (p_2 + p_3 + 1) >> 1$ |
| 7, 5 | $g_j = 58 - j * 13$, can also be described as g = {58, 45, 32, 19, 6} |

TABLE 4-continued

| | |
|---|---|
| (p side: 7) | $f_i = 59 - i * 9$, can also be described as f = {59, 50, 41, 32, 23, 14, 5} |
| q side: 5) | Middle7, 5 = (2 * ($p_o + q_o + p_1 + q_1$) + $q_2 + p_2 + q_3 + p_3 + q_4 + p_4 + q_5 + p_5 + 8$) » 4 |
| | $Q_5 = (q_4 + q_5 + 1)$ » 1, $P_7 = (p_6 + p_7 + 1)$ » 1 |
| 5, 7 | $g_j = 59 - j * 9$, can also be described as g = {59, 50, 41, 32, 23, 14, 5} |
| (p side: 5) | $f_i = 58 - i * 13$, can also be described as f = {58, 45, 32, 19, 6} |
| q side: 7) | Middle5, 7 = (2 * ($q_o + p_o + p_1 + q_1$) + $q_2 + p_2 + q_3 + p_3 + q_4 + p_4 + q_5 + p_5 + 8$) » 4 |
| | $Q_7 = (q_6 + q_7 + 1)$ » 1, $P_5 = (p_4 + p_5 + 1)$ » 1 |
| 5, 5 | $g_j = 58 - j * 13$, can also be described as g = {58, 45, 32, 19, 6} |
| (p side: 5) | $f_i = 58 - i * 13$, can also be described as f = {58, 45, 32, 19, 6} |
| q side: 5) | Middle5, 5 = (2 * ($q_o + p_o + p_1 + q_1 + q_2 + p_2$) + $q_3 + p_3 + q_4 + p_4 + 8$) » 4 |
| | $Q_5 = (q_4 + q_5 + 1)$ » 1, $P_5 = (p_4 + p_5 + 1)$ » 1 |
| 5, 3 | $g_j = 53 - j * 21$, can also be described as g = {53, 32, 11} |
| (p side: 5) | $f_i = 58 - i * 13$, can also be described as f = {58, 45, 32, 19, 6} |
| q side: 3) | Middle5, 3 = ($q_o + p_o + p_1 + q_1 + q_2 + p_2 + q_3 + p_3 + 4$) » 3 |
| | $Q_3 = (q_2 + q_3 + 1)$ » 1, $P_5 = (p_4 + p_5 + 1)$ » 1 |
| 3, 5 | $g_j = 58 - j * 13$, can also be described as g = {58, 45, 32, 19, 6} |
| (p side: 3) | $f_i = 53 - i * 21$, can also be described as f = {53, 32, 11} |
| q side: 5) | Middle3, 5 = $q_o + p_o + p_1 + q_1 + q_2 + p_2 + q_3 + p_3 + 4$) » 3 |
| | $Q_5 = (q_4 + q_5 + 1)$ » 1, $P_3 = (p_2 + p_3 + 1)$ » 1 |

3.5 Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering as shown in Table 2. The conditions in Table 2 are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows. In the second condition:

d is then derived as in HEVC luma deblocking. The second condition will be TRUE when d is less than β.

In the third condition StrongFilterCondition is derived as follows:

dpq is derived as in HEVC.

$sp_3$=Abs($p_3-p_0$), derived as in HEVC $sq_3$=Abs($q_0-q_3$), derived as in HEVC As in HEVC design, StrongFilterCondition=(dpq is less than (β>>2), sp3+sq3 is less than (β>>3), and Abs(p0−q0) is less than ($5*t_C$+1)>>1).

3.6 Strong Deblocking Filter for Chroma

The following strong deblocking filter for chroma is defined:

$p_2'=(3*p_3+2*p_2+p_1+p_0+q_0+4)>>3$ $p_1'=(2*p_3+p_2+2*p_1+p_0+q_0+q_1+4)>>3$ $p_0'=(p_3+p_2+p_1+2*p_0+q_0+q_1+q_2+4)<<3$

The proposed chroma filter performs deblocking on a 4×4 chroma sample grid.

3.7 Position Dependent Clipping

The position dependent clipping tcPD is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with an asymmetrical filter, depending on the result of decision-making process in section 3.2, position dependent threshold table is selected from two tables (i.e., Tc7 and Tc3 tabulated below) that are provided to decoder as a side information:

$Tc7=\{6,5,4,3,2,1,1\}$;

$Tc3=\{6,4,2\}$;

$tcPD=(Sp==3)?Tc3:Tc7$;

$tcQD=(Sq==3)?Tc3:Tc7$;

For the P or Q boundaries being filtered with a short symmetrical filter, position dependent threshold of lower magnitude is applied:

$Tc3=\{3,2,1\}$;

Following defining the threshold, filtered p'i and q'i sample values are clipped according to tcP and tcQ clipping values $p''_i=Clip3(p'_i+tcP_i, p'_i-tcP_i, p'_i)$;

$q''_j=Clip3(q'_j+tcQ_j, q'_j-tcQ_j, q'_j)$;

where p'i and q'i are filtered sample values, p"i and qui are output sample value after the clipping, and tcPi, tcQi are clipping thresholds that are derived from the VVC tc parameter and tcPD and tcQD. The function Clip3 is a clipping function as it is specified in VVC.

3.8 Sub-Block Deblocking Adjustment

To enable parallel friendly deblocking using both long filters and sub-block deblocking, the long filters are restricted to modify at most 5 samples on a side that uses sub-block deblocking (AFFINE or ATMVP or DMVR) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that are not aligned with the CU boundary.

```
If (mode block Q == SUBBLOCKMODE && edge !=0) {
if (!(implicitTU && (edge == (64 / 4))))
    if (edge == 2 || edge == (orthogonalLength - 2) || edge == (56 / 4) || edge == (72 / 4))
       Sp = Sq = 2;
    else
       Sp = Sq = 3;
  else
    Sp = Sq = bSideQisLargeBlk ? 5:3
}
``` where edge equal to 0 corresponds to CU boundary, edge equal to 2 or equal to orthogonalLength−2 corresponds to sub-block boundary 8 samples from a CU boundary etc. Where implicit TU is true if implicit split of TU is used.

3.9 Restriction to 4CTU/2CTU Line Buffers for Luma/Chroma

Filtering of horizontal edges is limiting Sp=3 for luma, Sp=1 and Sq=1 for chroma, when the horizontal edge is aligned with the CTU boundary.

4 Examples of Intra Subblock Partitioning (ISP)

Figure 6A:
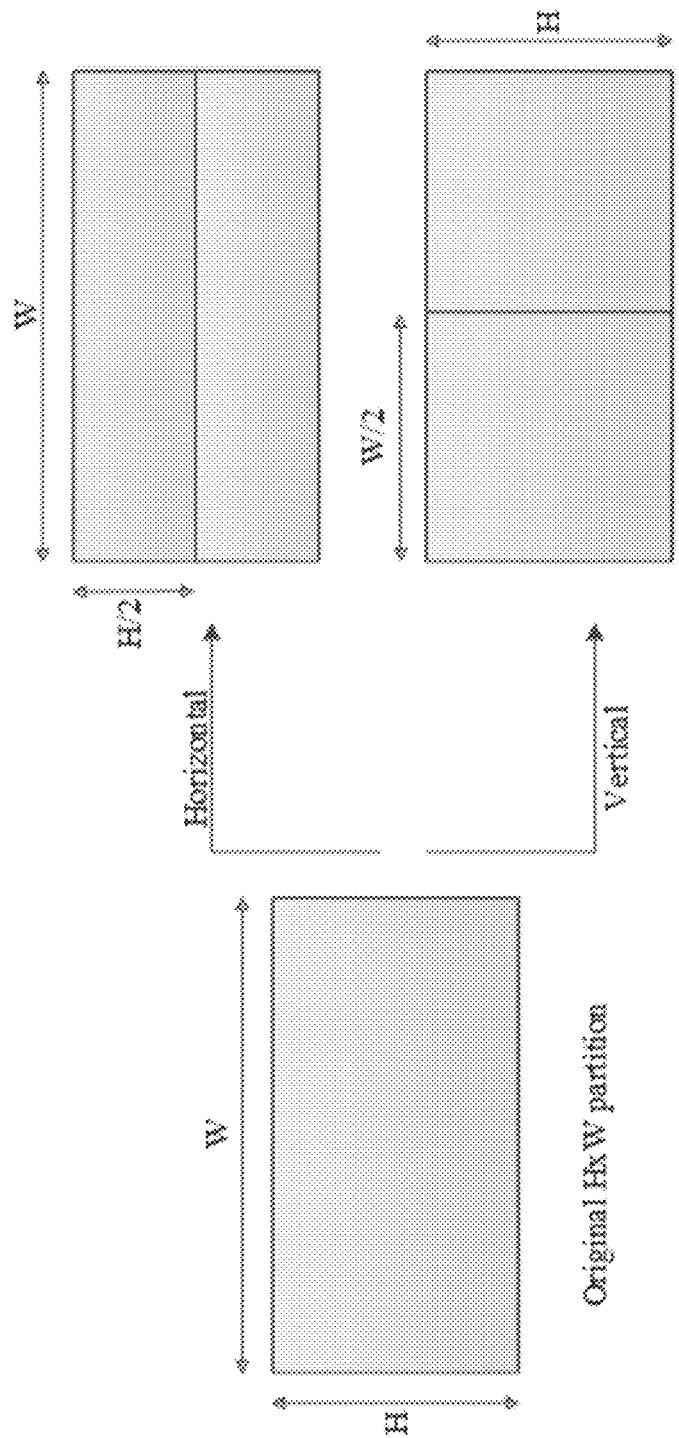
FIG. 6A shows an example of division of 4×8 and 8×4 blocks.
Figure 6B:
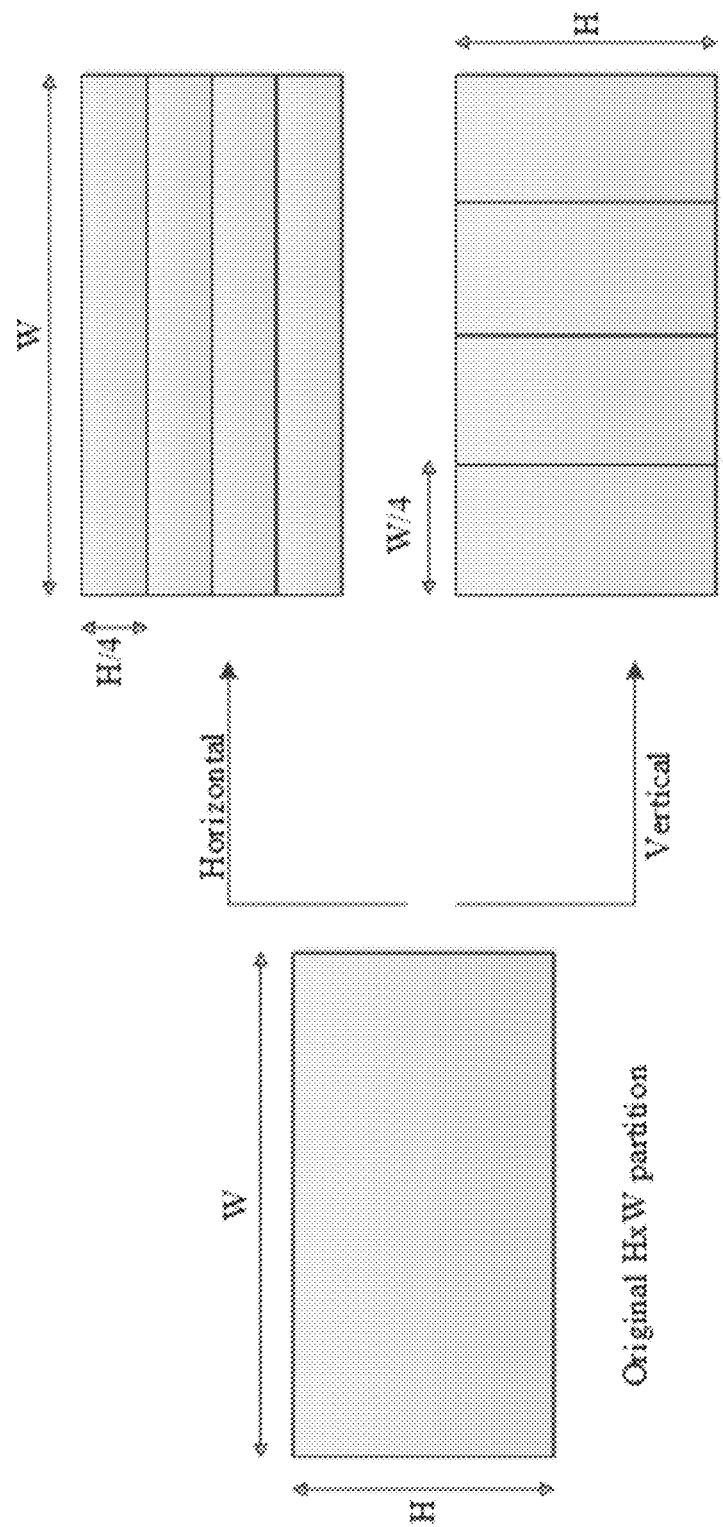
FIG. 6B shows an example of division of all blocks except 4×8, 8×4 and 4×4.

FIG. 6A shows an example of division of 4×8 and 8×4 blocks. FIG. 6B shows an example of division of all blocks except 4×8, 8×4 and 4×4.

In JVET-M0102, ISP is proposed, which divides luma intra-predicted blocks vertically or horizontally into 2 or 4 sub-partitions depending on the block size dimensions, as shown in Table 3. FIG. 6A and FIG. 6B show examples of the two possibilities. All sub-partitions fulfill the condition of having at least 16 samples. For block sizes, 4×N or N×4 (with N>8), if allowed, the 1×N or N×1 sub-partition may exist.

TABLE 5

| Splitting direction | Block Size | Number of Sub-Partitions |
|---|---|---|
| N/A | minimum transform size | Not divided |
| 4 × 8: horizontal<br>8 × 4: vertical | 4 × 8 and 8 × 4 | 2 |
| Signalled | If neither 4 × 8 nor 8 × 4, and W <= maxTBSize and H <= maxTBSize | 4 |
| Horizontal | If not above cases and H > maxTBSize | 4 |
| Vertical | If not above cases and H > maxTBSize | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

TABLE 6

| predModeIntra | trTypeHor | trTypeVer |
|---|---|---|
| INTRA_PLANAR,<br>INTRA_ANGULAR31,<br>INTRA_ANGULAR32,<br>INTRA_ANGULAR34, | ( nTbW >= 4 && nTbW <= 16 ) ?<br>DST-VII : DCT-II | ( nTbH >= 4 && nTbH <= 16 ) ?<br>DST-VII : DCT-II |

TABLE 6-continued

| predModeIntra | trTypeHor | trTypeVer |
|---|---|---|
| INTRA_ANGULAR36,<br>INTRA_ANGULAR37<br>INTRA_ANGULAR33,<br>INTRA_ANGULAR35 | DCT-II | DCT-II |
| INTRA_ANGULAR2,<br>INTRA_ANGULAR4, . . . ,<br>INTRA_ANGULAR28,<br>INTRA_ANGULAR30,<br>INTRA_ANGULAR39,<br>INTRA_ANGULAR41, . . . ,<br>INTRA_ANGULAR63,<br>INTRA_ANGULAR65 | ( nTbW >= 4 && nTbW <= 16 ) ?<br>DST-VII : DCT-II | DCT-II |
| INTRA_ANGULAR3,<br>INTRA_ANGULAR5, . . . ,<br>INTRA_ANGULAR27,<br>INTRA_ANGULAR29,<br>INTRA_ANGULAR38,<br>INTRA_ANGULAR40, . . . ,<br>INTRA_ANGULAR64,<br>INTRA_ANGULAR66 | DCT-II | ( nTbH >= 4 && nTbH <= 16 ) ?<br>DST-VII : DCT-II |

5 Examples of Affine Linear Weighted Intra Prediction (ALWIP, a.k.a. Matrix Based Intra Prediction)

Affine linear weighted intra prediction (ALWIP, a.k.a. Matrix based intra prediction (MIP)) is proposed in JVET-N0217.

5.1 Generation of the Reduced Prediction Signal by Matrix Vector Multiplication

The neighboring reference samples are firstly down-sampled via averaging to generate the reduced reference signal bdry$_{red}$. Then, the reduced prediction signal pred$_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} H_{red}$.

5.2 Illustration of the Entire ALWIP Process

The entire process of averaging, matrix vector multiplication and linear interpolation is illustrated for different shapes in FIGS. 7A-7D. Note, that the remaining shapes are treated as in one of the depicted cases.

Figure 7A:
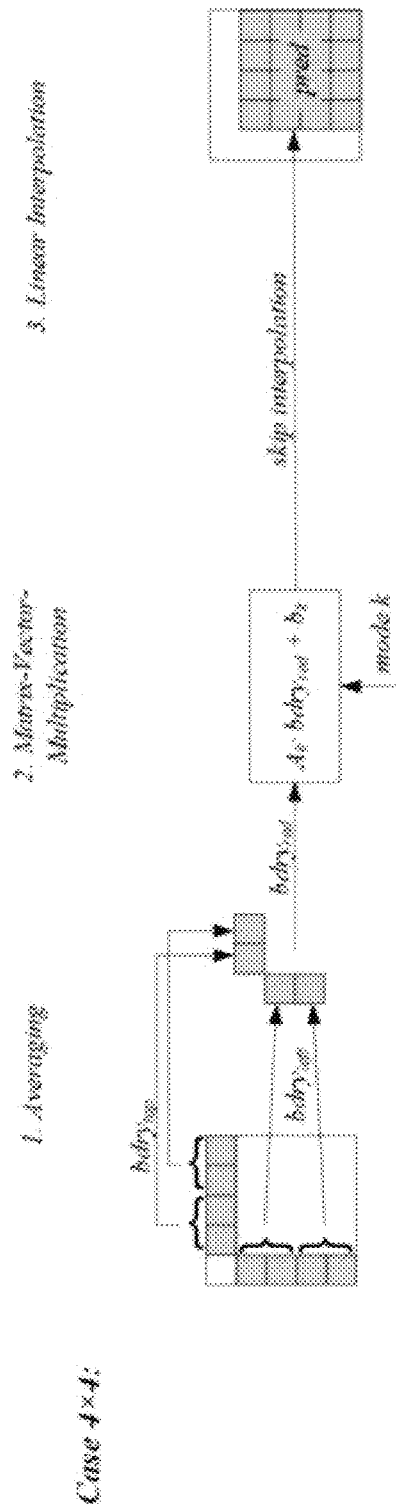
FIG. 7A shows an example of affine linear weighted intra prediction (ALWIP) for 4×4 blocks.

FIG. 7A shows an example of affine linear weighted intra prediction (ALWIP) for 4×4 blocks. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

Figure 7B:
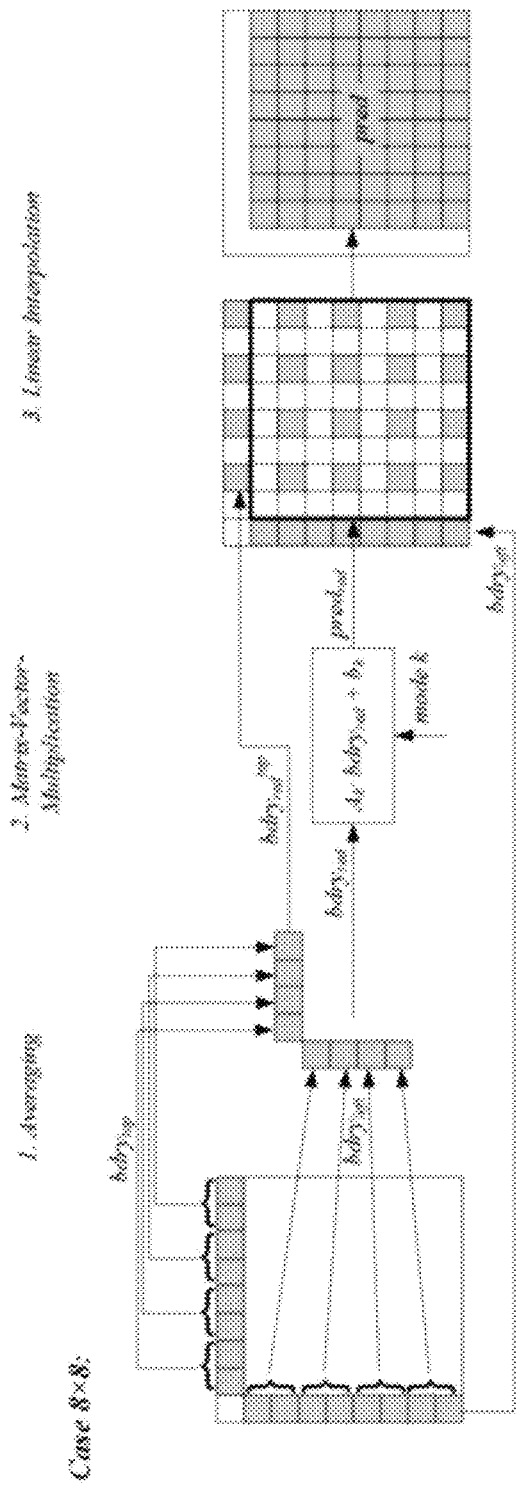
FIG. 7B shows an example of ALWIP for 8×8 blocks.

FIG. 7B shows an example of ALWIP for 8×8 blocks. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

Figure 7C:
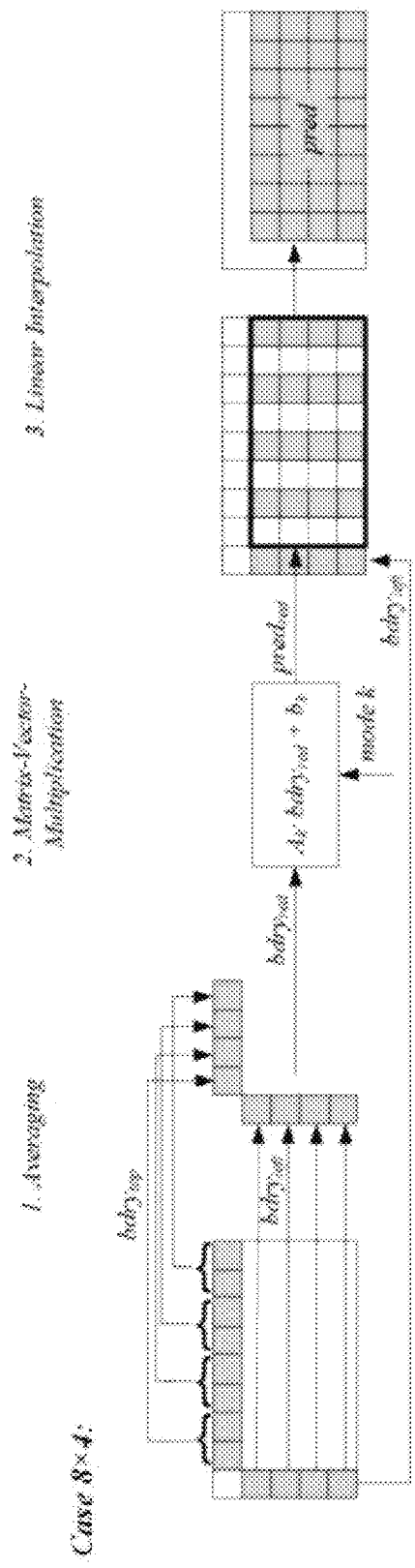
FIG. 7C shows an example of ALWIP for 8×4 blocks.

FIG. 7C shows an example of ALWIP for 8×4 blocks. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary. The transposed case is treated accordingly.

Figure 7D:
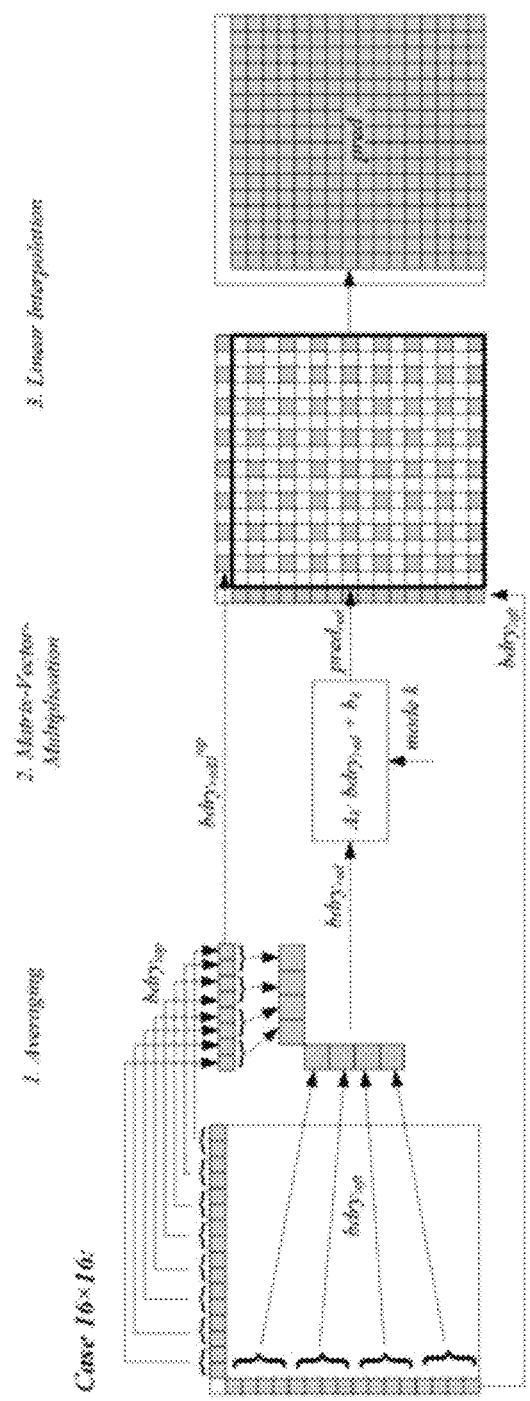
FIG. 7D shows an example of ALWIP for 16×16 blocks.

FIG. 7D shows an example of ALWIP for 16×16 blocks. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical position.

Finally, for W×4 blocks with W>8, let $A_k$ be the matrix that arises by leaving out every row that corresponds to an odd entry along the horizontal axis of the down-sampled block. Thus, the output size is 32 and again, only horizontal interpolation remains to be performed. The transposed cases are treated accordingly.

6 Examples of Multiple Transform Set (MTS) in VVC 6.1 Explicit Multiple Transform Set (MTS)

In VTM4, large block-size transforms, up to 64×64 in size, are enabled, which is primarily useful for higher resolution video, e.g., 1080p and 4K sequences. High-frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to discrete cosine transform (DCT)-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table 7 shows the basis functions of the selected DST/DCT.

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10 bits.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32
Coded block flag (CBF) flag is equal to one

TABLE 7

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{4N+1}\right)$ |

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 8. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 8

Mapping of decoded value of tu_mts_idx and corresponding transform matrices for the horizontal and vertical directions

| Bin string of | | Intra/inter | |
|---|---|---|---|
| tu_mts_idx | tu_mts_idx | Horizontal | Vertical |
| 0 | 0 | DCT2 | |
| 1 0 | 1 | DST7 | DST7 |
| 1 1 0 | 2 | DCT8 | DST7 |
| 1 1 1 0 | 3 | DST7 | DCT8 |
| 1 1 1 1 | 4 | DCT8 | DCT8 |

To reduce the complexity of large size DST-7 and DCT-8, high-frequency transform coefficients are zeroed out for the DST-7 and DCT-8 blocks with size (width or height, or both width and height) equal to 32. Only the coefficients within the 16×16 lower-frequency region are retained. In addition to the cases wherein different transforms are applied, VVC also supports a mode called transform skip (TS) which is like the concept of TS in the HEVC. TS is treated as a special case of MTS.

6.2 Implicit Multiple Transform Set (MTS)

It is noted that ISP, SBT, and MTS enabled but with implicit signalling are all treated as implicit MTS.

In this patent document, the implicitMtsEnabled is used to define whether implicit MTS is enabled.

8.7.4 Transformation Process for Scaled Transform Coefficients 8.7.4.1 General

The variable implicitMtsEnabled is derived as follows:

If sps_mts_enabled_flag is equal to 1 and one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32 sps_explicit_mts_intra_enabled_flag and sps_explicit_mts_inter_enabled_flag are both equal to 0 and CuPredMode[xTbY][yTbY] is equal to MODE_INTRA Otherwise, implicitMtsEnabled is set equal to 0.

The variable trTypeHor specifying the horizontal transform kernel and the variable trTypeVer specifying the vertical transform kernel are derived as follows:

If cIdx is greater than 0, trTypeHor and trTypeVer are set equal to 0.

Otherwise, if implicitMtsEnabled is equal to 1, the following applies:

If IntraSubPartitionsSplitType is not equal to ISP_NO_SPLIT, trTypeHor and trTypeVer are specified in Table 8-15 depending on intraPredMode.

Otherwise, if cu_sbt_flag is equal to 1, trTypeHor and trTypeVer are specified in Table 8-14 depending on cu_sbt_horizontal_flag and cu_sbt_pos_flag.

Otherwise (sps_explicit_mts_intra_enabled_flag and sps_explicit_mts_inter_enabled_flag are equal to 0), trTypeHor and trTypeVer are derived as follows:

trTypeHor=
 (nTbW>=4&&nTbW<=16&&nTbW<=nTbH)?
 1:0    (8-1030)

trTypeVer=
 (nTbH>=4&&nTbH<=16&&nTbH<=nTbW)?1:0    (8-1031)

Otherwise, trTypeHor and trTypeVer are specified in Table 8-13 depending on tu_mts_idx[xTbY][yTbY].

TABLE 8-13

Specification of trTypeHor and trTypeVer depending on tu_mts_idx[ x ][ y ]

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

TABLE 8-14

Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

7 Examples of Reduced Secondary Transform (RST) Proposed in JVET-N0193

7.1 Non-Separable Secondary Transform (NSST) in JEM

Figure 8:
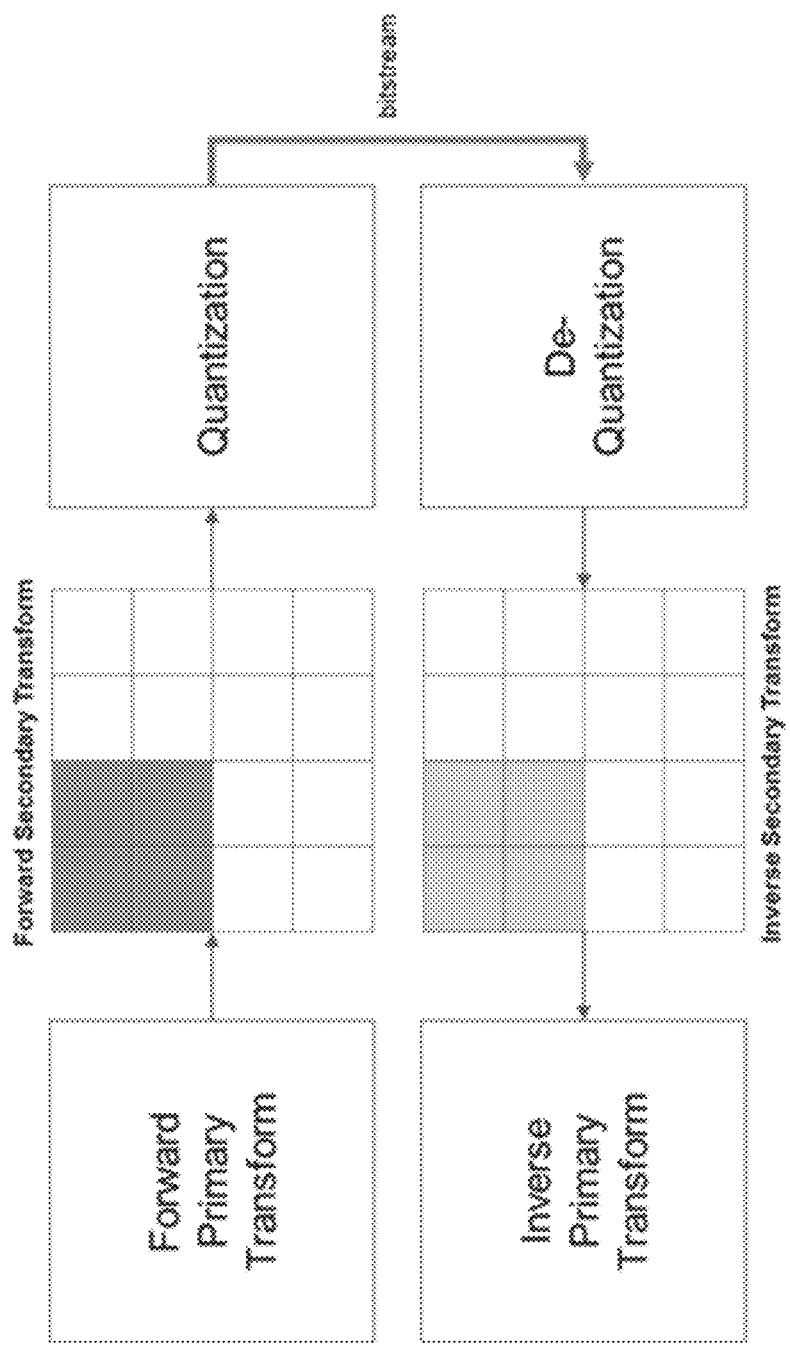
FIG. 8 shows an example of secondary transform in Joint Exploration Model (JEM).

FIG. 8 shows an example of secondary transform in JEM. In JEM, secondary transform is applied between forward primary transform and quantization (at encoder) and between de-quantization and invert primary transform (at decoder side). As shown in FIG. 8, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}\, X_{01}\, X_{02}\, X_{03}\, X_{10}\, X_{11}\, X_{12}\, X_{13}\, X_{20}\, X_{21}\, X_{22}\, X_{23}\, X_{30}\, X_{31}\, X_{32}\, X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector is subsequently re-organized as 4×4 block using the scanning order for that block (horizontal, vertical or diagonal). The coefficients with a smaller index will be placed with the smaller scanning index in the 4×4 coefficient block. There are a total of 35 transform sets, and 3 non-separable transform matrices (kernels) per transform set are used. The mapping from the intra prediction mode to the transform set is pre-defined. For each transform set, the selected non-separable secondary transform (NSST) candidate is further specified by the explicitly signalled secondary transform index. The index is signalled in a bit-stream once per Intra CU after transform coefficients.

7.2 Reduced Secondary Transform (RST) in JVET-N0193

Figure 9:
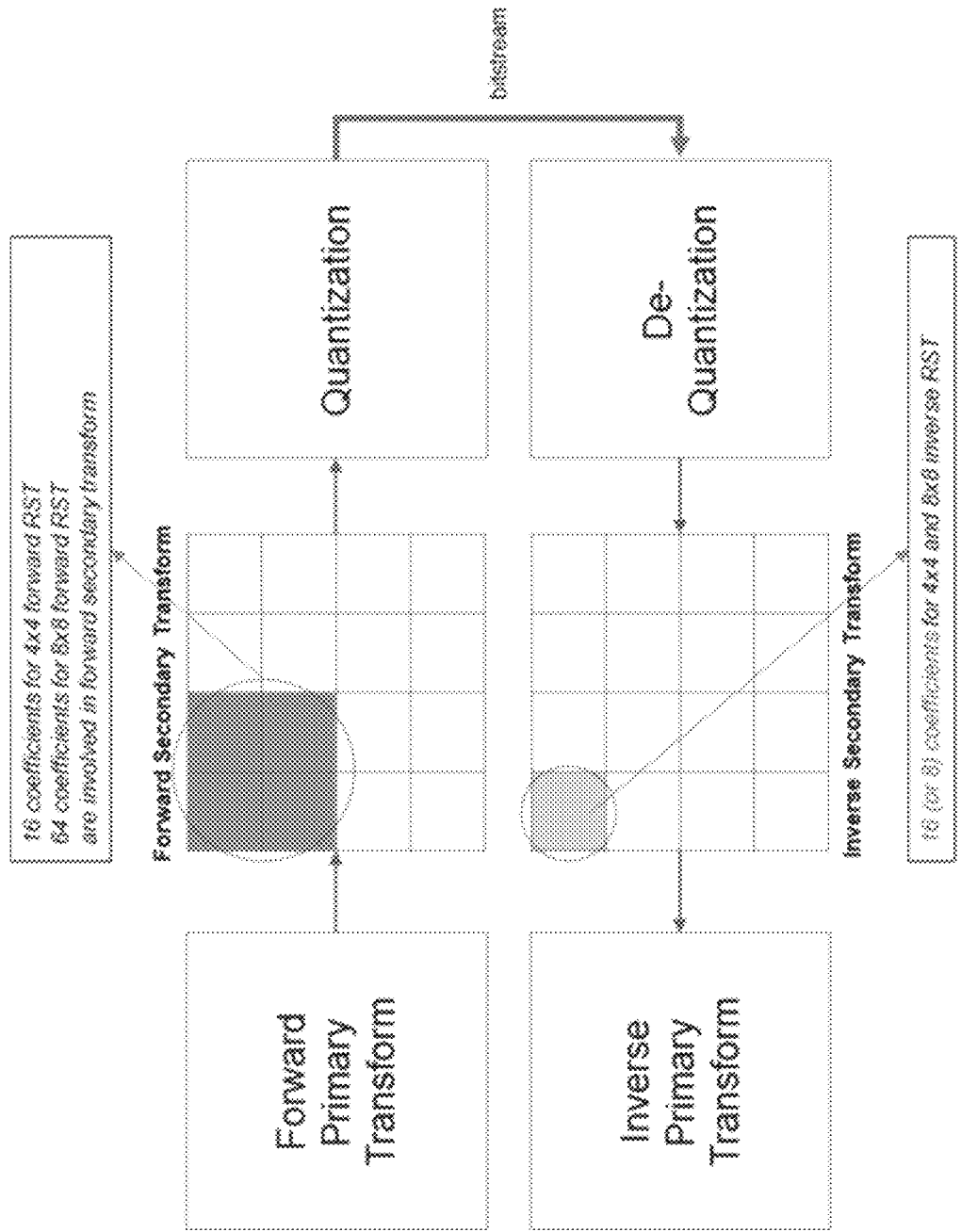
FIG. 9 shows an example of reduced secondary transform (RST) based on an embodiment of the present disclosure.

FIG. 9 shows an example of reduced secondary transform (RST) based on an embodiment of the present disclosure. The RST (Low-Frequency Non-Separable Transform (LFNST)) was introduced in JVET-K0099 and 4 transform set (instead of 35 transform sets) mapping introduced in JVET-L0133. In this JVET-N0193, 16×48 and 16×16 matrices are employed for 8×8 and 4×4 blocks, respectively. For notational convenience, the 16×48 transform is denoted as RST8×8 and the 16×16 transform is denoted as RST4×4.

7.3 Application of RST

The selection of RST is defined as follows:
- For a 4*N or N*4 block (N<=8), apply RST4×4 to the top-left 4*4 CG (e.g., 4×4, 4×8, 8×4)
- For a 4*N or N*4 block (N>8), apply RST4×4 twice to the two adjacent top-left 4*4 CGs (e.g., 4×16, 16×4 etc. al)
- For all the other cases, apply secondary transform to the top-left three 4*4 CG to generate the top-left 4×4 CG and the other two CGs with all zero coefficients.

8 Examples of Sub-Block Transform

For an inter-predicted CU with cu_cbf equal to 1, cu_sbt_flag may be signalled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

Figure 10:
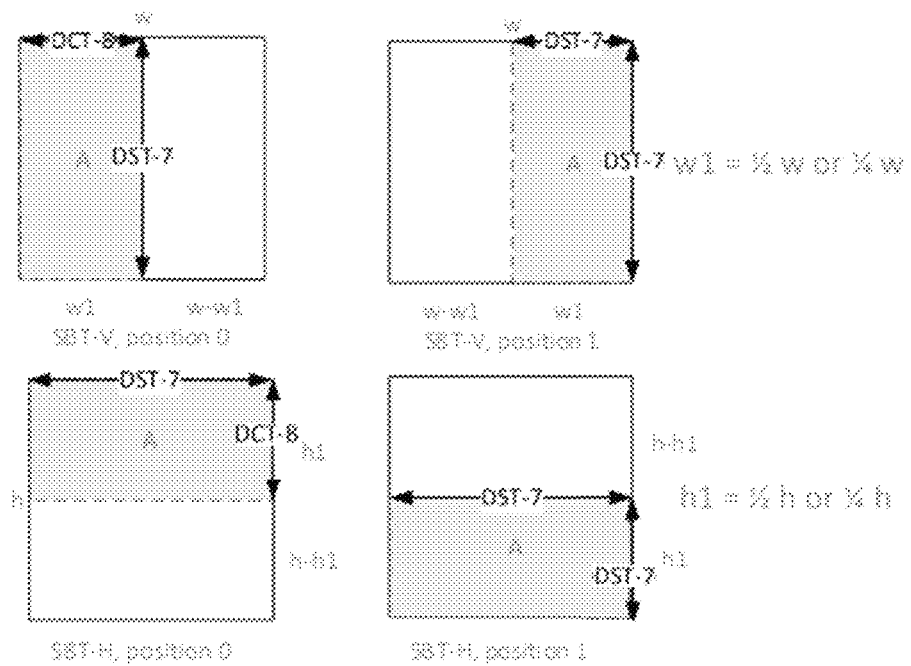
FIG. 10 shows an example of sub-block transform modes SBT-V and SBT-H.

FIG. 10 shows an example of sub-block transform modes SBT-V and SBT-H. In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 10. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

9 Examples of Joint Chroma Residual Coding in JVET-N0054

As Cb and Cr residuals appear to correlate inversely with each other, it is proposed to take advantage of this phenomenon and introduce a mode for joint coding of the chrominance residuals. In this mode there is a single residual indicated for the two chrominance blocks of a transform unit. The indicated residual is added to the prediction block in the first channel (typically representing Cb) and deducted from the prediction block in the second channel (typically representing Cr).

The joint residual mode is indicated with a flag in the bitstream if the coded block flags (cbf) for both Cb and Cr are true. If the mode is activated, a single residual block is decoded. The bitstream syntax and decoding process of joint residual blocks follow those of the Cb residual in VTM-4. The residuals of the Cr blocks are generated by negating the decoded joint residual. As a single residual is used to represent residuals of two blocks, it may often be desirable for this mode to use a QP lower than what is used for separate coding of chrominance residuals. In the CE tests a chroma QP offset of −1 was used for the joint mode and +1 was used for separate chroma coding (as specified in the JVET common test conditions).

10 Examples of JVET-N0236

This contribution proposes a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction l(i, j).

Step 2) The spatial gradients $g_x(i, j)$ and $g_y(i, j)$ of the sub-block prediction are calculated at each sample location using a 3-tap filter [−1, 0, 1].

$$g_x(i,j)=l(i+1,j)-l(i-1,j)$$

$$g_y(i,j)=l(i,j+1)-l(i,j-1)$$

Figure 11:
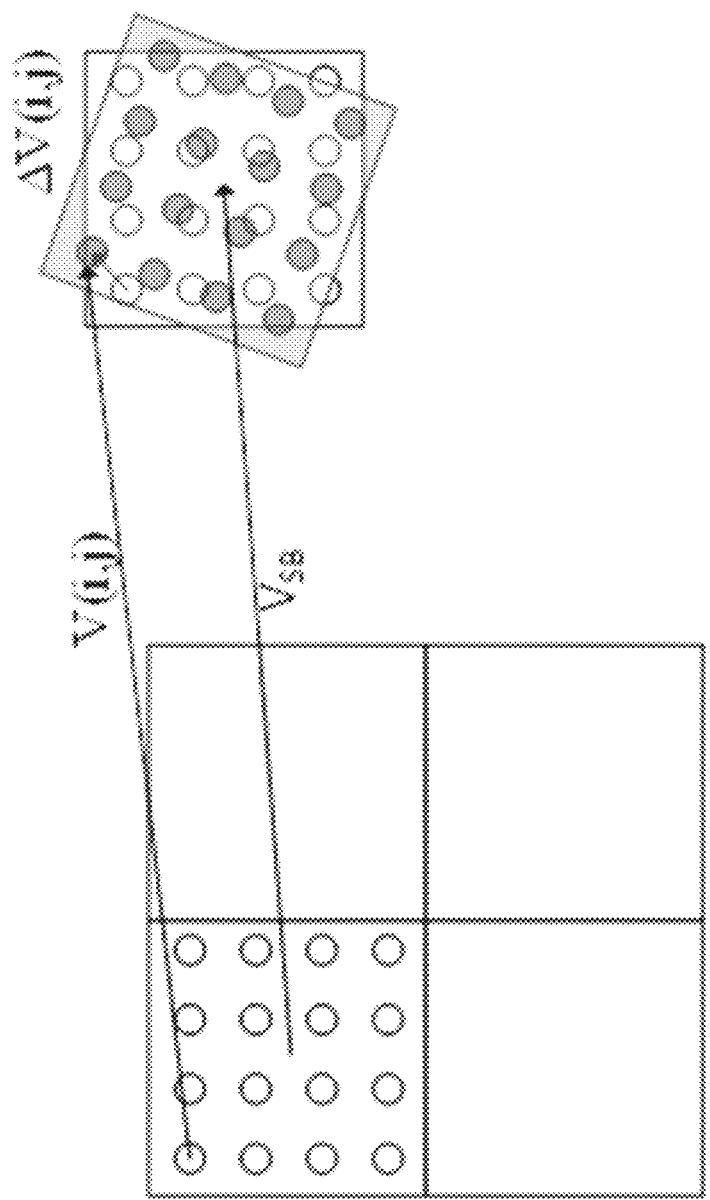
FIG. 11 shows an example of sub-block motion vector (MV) VSB and pixel Δv(i, j).

FIG. 11 shows an example of sub-block MV VSB and pixel Δv(i, j). The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Step 3) The luma prediction refinement (denoted ΔI) as is calculated by the optical flow equation.

$$\Delta I(i,j)=g_x(i,j)*\Delta v_x(i,j)+g_y(i,j)*\Delta v_y(i,j)$$

where the delta MV (denoted as Δv(i, j)) is the difference between pixel MV computed for sample location (i, j), denoted by v(i, j), and the sub-block MV of the sub-block to which pixel (i, j) belongs, as shown in FIG. 11.

Since the affine model parameters and the pixel location relative to the sub-block center are not changed from sub-block to sub-block, Δv(i, j) can be calculated for the first sub-block, and reused for other sub-blocks in the same CU. Let x and y be the horizontal and vertical offset from the pixel location to the center of the sub-block, Δv(x, y) can be derived by the following equation, $$\begin{cases} \Delta v_x(x, y) = c*x + d*y \\ \Delta v_y(x, y) = e*x + f*y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i, j). The final prediction I' is generated as the following equation.

$$I'(i,j)=I(i,j)+\Delta I(i,j)$$

11 Drawbacks of Existing Implementations

In some existing implementations (e.g., the current VVC/VTM deblocking design), the following problems are encountered:

(1) Bi-directional optical flow (BDOF) refines each prediction sample. Therefore, it may be not needed to filter them again in the deblocking process.

(2) CIIP coded blocks are treated as inter prediction mode in the deblocking filter process while it still needs to perform intra prediction process.

12 Exemplary Methods for Improvements in Deblocking Filtering (DB)

Embodiments of the present disclosure overcome the drawbacks of existing implementations, thereby providing video coding with higher coding efficiencies. The improvement of deblocking filtering (DB), based on the disclosed embodiments, may enhance both existing and future video coding standards, is elucidated in the following examples described for various implementations. The examples of the present disclosure provided below explain general concepts, and are not meant to be interpreted as limiting. In an example, unless explicitly indicated to the contrary, the various features described in these examples may be combined.

In some embodiments of the present disclosure, it is proposed to modify the deblocking filter (DB) process in several ways. However, it should be noted that the methods presented in this document may be also applicable to other kinds of in-loop filtering methods (e.g., SAO, ALF) and post-reconstruction filters (e.g., bilateral filter, diffusion filter, Hadamard transform domain filter which applied to prediction signal or reconstruction signal before deblocking filter).

It is noted that the chroma components may represent the Cb/Cr colour components, or B/R colour components for the RGB format. In the following descriptions, we take 'Cb/Cr' for examples.

Example 1

Whether to enable DB and/or how to apply filtering in the DB process may depend on usage of BDOF and/or other coding tools that use optical flow to refine motion/prediction samples/reconstruction samples.
(a) In one example, for samples located within a BDOF coded block, there is no need to apply DB.
(b) Alternatively, the boundary strength/filter strength may depend on the usage of BDOF.
(i) Alternatively, for samples located within a BDOF coded block, a weaker filter may be applied.

Example 2

Whether to enable DB and/or how to apply filtering in the DB process may depend on the transform matrix type (e.g., DCT-II, DST-VII, DCT-VIII, transform skip mode (with identify matrix), coding methods which doesn't apply transform such as a residue differential pulse-code modulation (RDPCM) or a quantized residue differential pulse-code modulation (QR-BDPCM) mode).
(a) In one example, the position dependent clipping may be disabled for samples to be filtered located at blocks coded with certain transform type (e.g., transform skip-coded blocks).
(i) Alternatively, furthermore, all samples to be filtered use the same clipping parameters.
(b) In one example, the position dependent clipping parameters may be dependent on the basis of transform matrices applied to that block.
(c) In one example, DB may not be performed on the block that of transform skip mode or coding methods which doesn't apply transform such as RDPCM mode.

Example 3

The clipping operation and/or the position dependent clipping may be disabled based on:
(a) Video contents (e.g. screen contents or natural contents).
(b) A message signalled in the SPS/VPS/PPS/picture header/slice header/tile group header/Largest coding unit (LCU)/Coding unit (CU)/LCU row/group of LCUs/.

Example 4

Whether to enable DB and/or how to apply filtering in the DB process may depend on usage of Combined Intra-Inter Prediction (CIIP).
(a) In one example, CIIP coded blocks may be treated similarly as intra coded blocks.
(b) In one example, when at least one of two blocks crossing the edge is coded with CIIP mode, the boundary strength is set to 2.
(c) Alternatively, when only one of the two blocks crossing the edge is coded with CIIP mode and the other is inter coded, the boundary strength is set to 1.
(d) Alternatively, when only one of the two blocks crossing the edge is coded with CIIP mode and the other is inter or IBC coded, the boundary strength is set to 1.

Example 5

The boundary strength (BS) of IBC-coded blocks may be independent from the motion vector difference.
(a) In one example, when the adjacent blocks are both IBC-coded, the boundary strength is set to M (e.g., M=0/1/2) regardless the MV difference and regardless whether there is non-zero coefficients.
(b) Alternatively, BS is dependent on whether the horizontal and/or vertical MV difference is greater than M0/M1-pels (M>1).
(i) In one example, M0 and M1 are both set to 4.
(ii) In one example, M0 is set to the minimum CU width for MV difference of the horizontal component, and M1 is set to the minimum CU height for MV difference of the horizontal component.
(iii) In one example, M0 is set to the minimum allowed IBC-coded CU width for MV difference of the horizontal component, and M1 is set to the minimum allowed IBC-coded CU height for MV difference of the horizontal component.

(c) Alternatively, DB may not be applied for boundaries between two IBC-coded blocks.
(d) Alternatively, DB may not be applied on samples of an IBC-coded block.

Example 6

The boundary strength (BS) value at the P-side or Q-side may be different.
(a) In one example, the blocks at P-side or Q-side may have its own boundary strength. The deblocking performed at P-side and Q-side may be based on the BS values at P-side and Q-side respectively.
(i) In one example, if the block at P-side is an intra block and the block at Q-side is a RDPCM-coded block, the deblocking conditions may be checked at the P-side and the deblocking may be only performed at P-side.
(ii) In one example, the BS for P-side and Q-side may depend on the QPs of the two sides.
(iii) In one example, the BS for P-side and Q-side may depend on the luma mapping with chroma scaling (LMCS) coefficients used in the two sides.

Example 7

A RDPCM-coded block may be treated as an intra block in the deblocking.
(a) In one example, the boundary strength (BS) value may be set to 1 or 2 if a RDPCM-coded block is at the P-side and/or Q-side.
Example 8. The diagonal edge in a triangle mode coded block may be deblocked.
(a) In one example, the deblocking filters and/or the deblocking control logic in the current VVC may be also applied on diagonal edge in a triangle mode coded block.
Example 9.
(a) In one example, the deblocking may be applied on P-side if a palette coded block is at Q-side and a block not coded in the palette mode is at the P-side.
(b) In one example, the deblocking may be applied on Q-side if a palette coded block is at P-side and a block not coded in the palette mode is at the Q-side.
(c) In one example, if both the P-side and Q-side are of palette coded blocks, the deblocking may not be applied on both sides.

Example 10

Sub-regions within one block coded with DMVR or other decoder side motion refinement coding tools may be treated as sub-block boundaries and may be filtered.
(a) In one example, the sub-region is defined to be sub-unit that motion vector refinement is applied on.
(i) In one example, the sub-region is defined to be the M×N sub-block within a DMVR coded block, wherein M and N may be set to 64 or 16.

Example 11

Whether to enable DB and/or how to apply filtering in the DB process may depend on whether secondary transform (a.k.a. NSST or RST or LFNST) is applied or not.
(a) In one example, boundaries of sub-regions wherein RST are applied may be treated as transform block boundaries or coding subblock boundaries.
(i) Alternatively, samples located at the RST applied sub-regions may be also filtered.
(ii) Alternatively, the position dependent clipping may be disabled for RST applied sub-regions.

Example 12

Whether deblocking is performed on subblock boundaries within an affine mode block (e.g., inner subblock boundaries) may depend on whether interweave prediction or/and PROF or/and phase-variant affine subblock motion compensation is applied to the block or not.
(a) In one example, deblocking may be disabled when interweave prediction or/and PROF or/and phase-variant affine subblock motion compensation is applied to the block.
(b) In one example, deblocking may be enabled when interweave prediction or/and PROF or/and phase-variant affine subblock motion compensation is not applied to the block.

Figure 12:
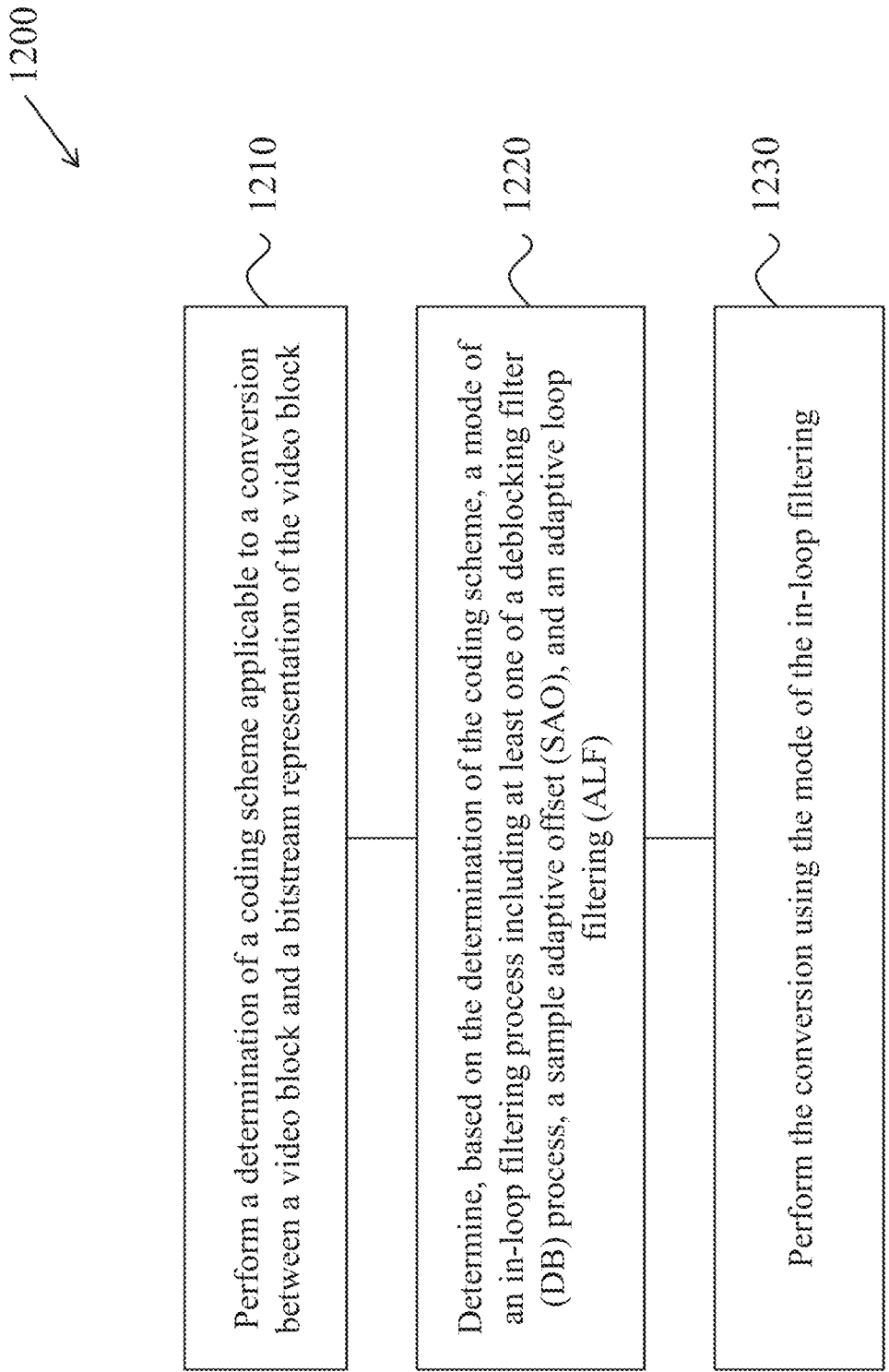
FIG. 12 shows a flowchart of example methods for video processing based on some embodiments of the present disclosure.

FIG. 12 shows a flowchart of an example method 1200 for video processing based on some embodiments of the present disclosure. The method 1200 for video processing includes, at step 1210, performing a determination of a coding scheme applicable to a conversion between a video block and a bitstream representation of the video block, at step 1220, determining, based on the determination of the coding scheme, a mode of an in-loop filtering process including at least one of a deblocking filter (DB) process, a sample adaptive offset (SAO), and an adaptive loop filtering (ALF), and, at step 1230, performing the conversion using the mode of the in-loop filtering. Additional features relating to the method 1200 for video processing can be found at Example 1, Example 2, Example 3, Example 11 discussed above.

Figure 13:
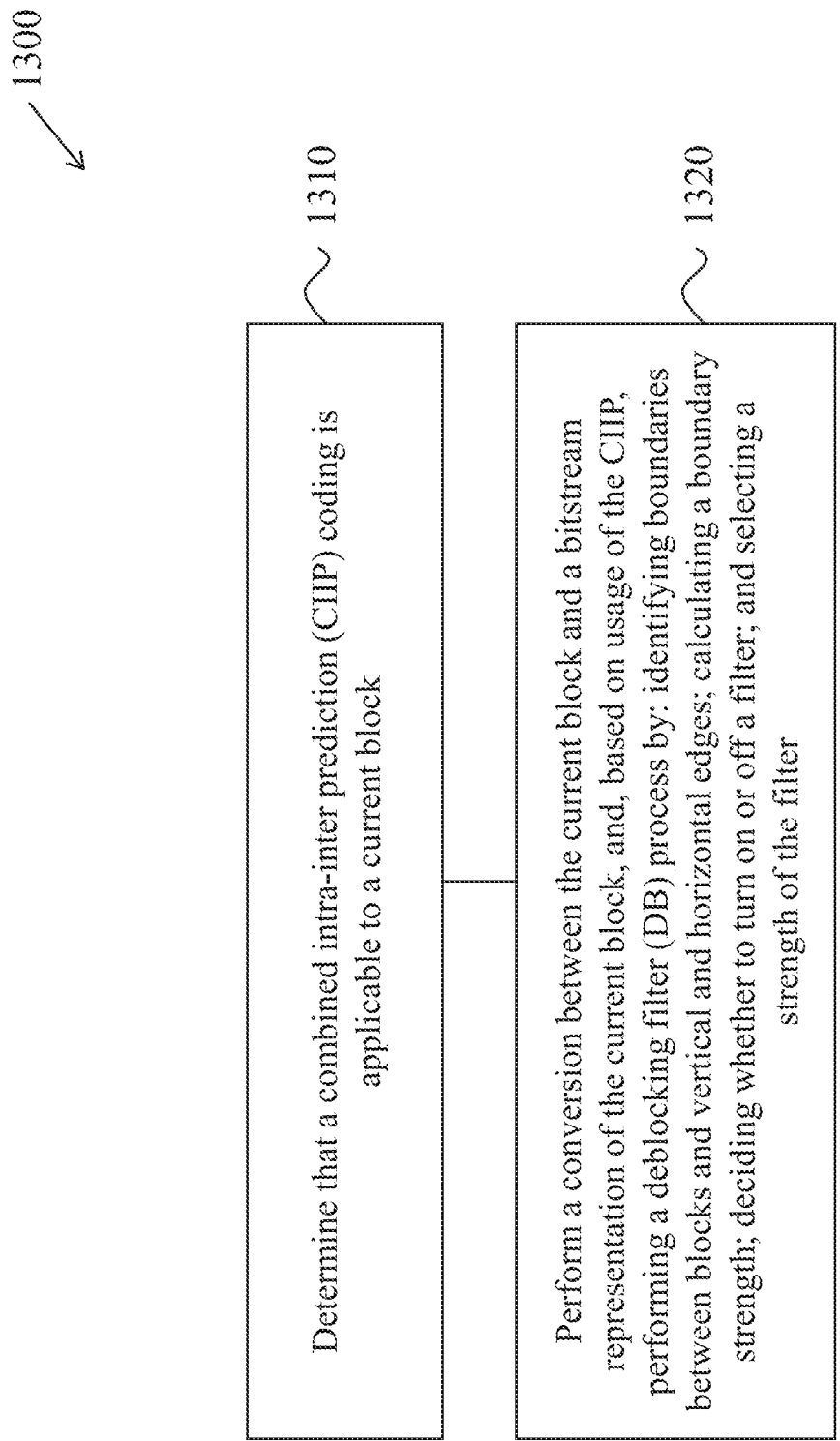
FIG. 13 shows a flowchart of example methods for video processing based on some embodiments of the present disclosure.

FIG. 13 shows a flowchart of another example method 1300 for video processing based on some embodiments of the present disclosure. The method 1300 for video processing includes, at step 1310, determining that a combined intra-inter prediction (CIIP) coding is applicable to a current block, and, at step 1320, performing a conversion between the current block and a bitstream representation of the current block, and, based on usage of the CIIP, performing a deblocking filter (DB) process by: identifying boundaries between blocks and vertical and horizontal edges; calculating a boundary strength; deciding whether to turn on or off a filter; and selecting a strength of the filter. Additional features relating to the method 1300 for video processing can be found at Example 4 discussed above.

Figure 14:
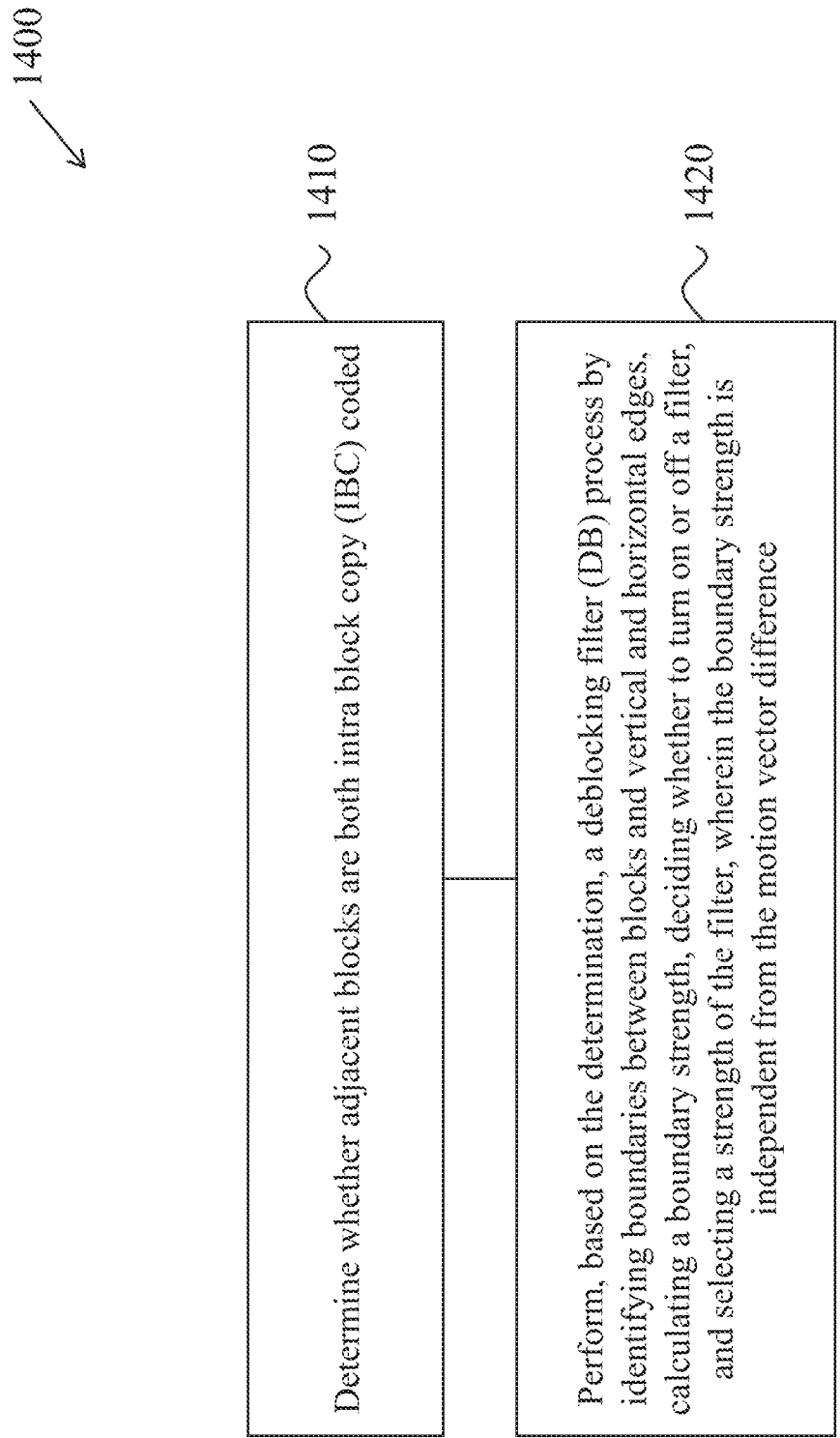
FIG. 14 shows a flowchart of example methods for video processing based on some embodiments of the present disclosure.

FIG. 14 shows a flowchart of another example method 1400 for video processing based on some embodiments of the present disclosure. The method 1400 for video processing includes, at step 1410, determining whether adjacent blocks are both intra block copy (IBC) coded, and, at step 1420, performing, based on the determination, a deblocking filter (DB) process by identifying boundaries between blocks and vertical and horizontal edges, calculating a boundary strength, deciding whether to turn on or off a filter, and selecting a strength of the filter. The boundary strength is independent from the motion vector difference. Additional features relating to the method 1400 for video processing can be found at Example 5 discussed above.

Figure 15:
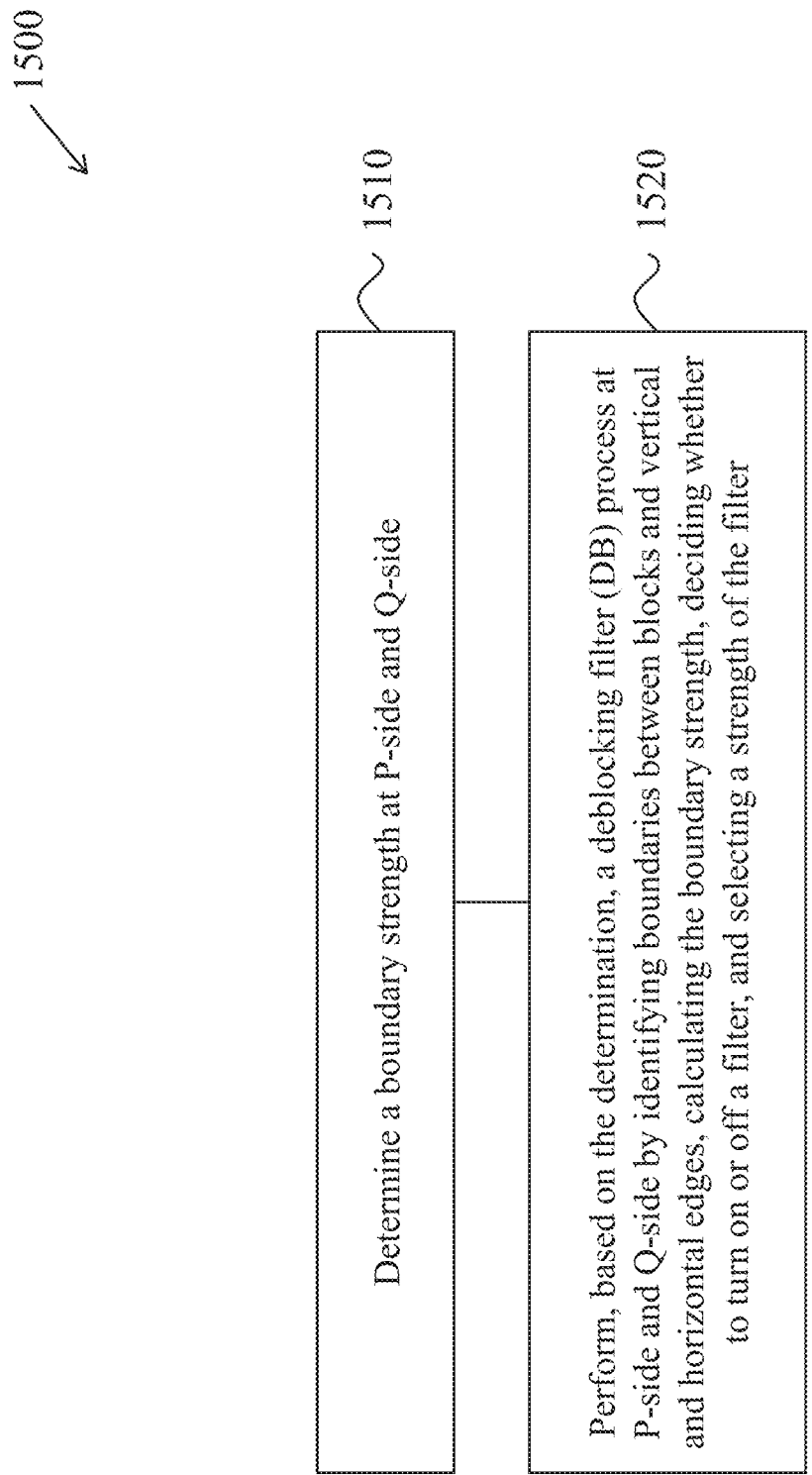
FIG. 15 shows a flowchart of example methods for video processing based on some embodiments of the present disclosure.

FIG. 15 shows a flowchart of another example method 1500 for video processing based on some embodiments of the present disclosure. The method 1500 for video processing includes, at step 1510, determining a boundary strength at P-side and Q-side, and, at step 1520, performing, based on the determination, a deblocking filter (DB) process at P-side and Q-side by identifying boundaries between blocks and vertical and horizontal edges, calculating the boundary strength, deciding whether to turn on or off a filter, and selecting a strength of the filter. Additional features relating to the method 1500 for video processing can be found at Example 6 discussed above.

Figure 16:
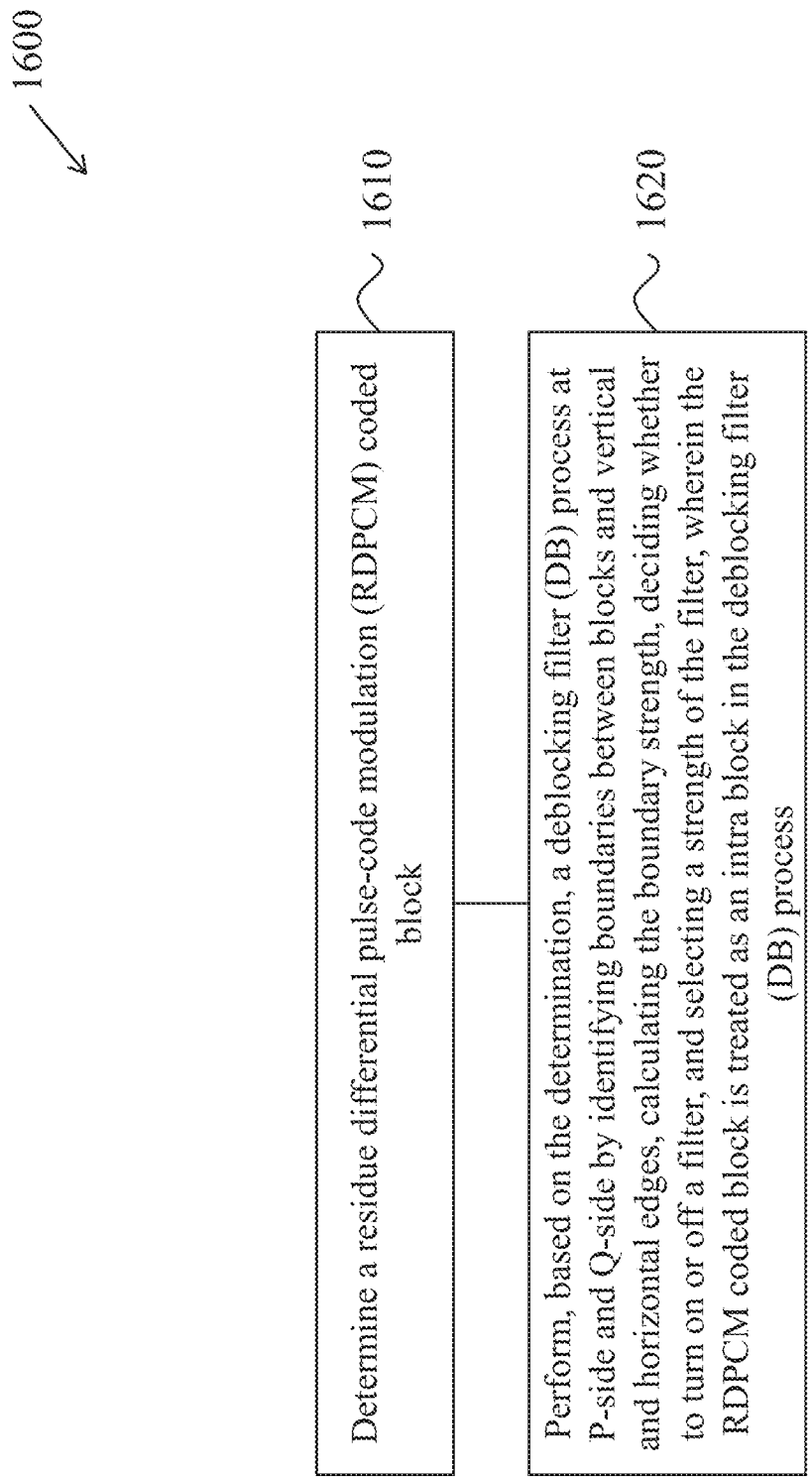
FIG. 16 shows a flowchart of example methods for video processing based on some embodiments of the present disclosure.

FIG. 16 shows a flowchart of another example method 1600 for video processing based on some embodiments of the present disclosure. The method 1600 for video processing includes, at step 1610, determining a residue differential pulse-code modulation (RDPCM) coded block, and, at step 1620, performing, based on the determination, a deblocking filter (DB) process at P-side and Q-side by identifying boundaries between blocks and vertical and horizontal edges, calculating the boundary strength, deciding whether to turn on or off a filter, and selecting a strength of the filter. The RDPCM coded block is treated as an intra block in the deblocking filter (DB) process. Additional features relating to the method 1600 for video processing can be found at Example 7 discussed above.

Figure 17:
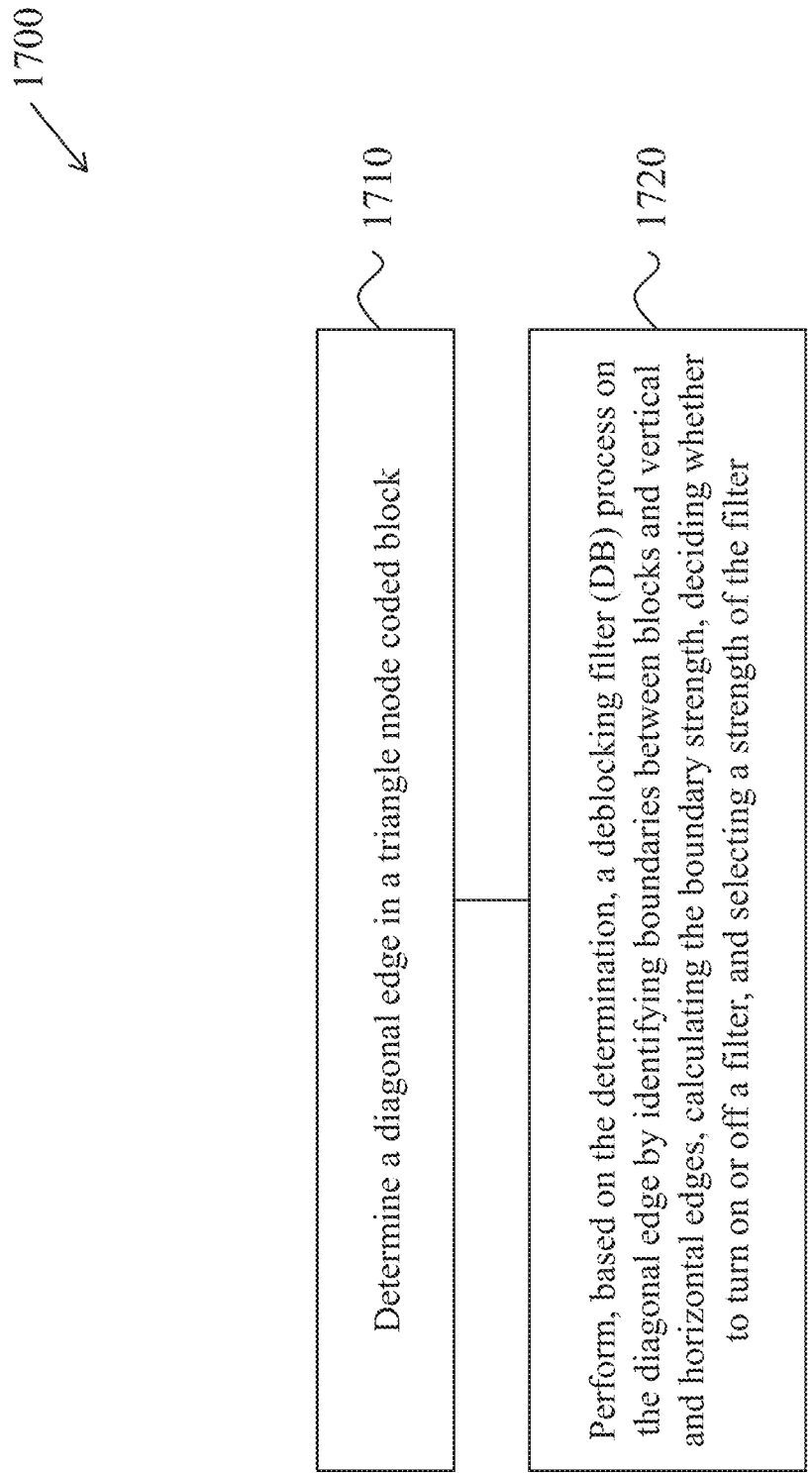
FIG. 17 shows a flowchart of example methods for video processing based on some embodiments of the present disclosure.

FIG. 17 shows a flowchart of another example method 1700 for video processing based on some embodiments of the present disclosure. The method 1700 for video processing includes, at step 1710, determining a diagonal edge in a triangle mode coded block, and, at step 1720, performing, based on the determination, a deblocking filter (DB) process on the diagonal edge by identifying boundaries between blocks and vertical and horizontal edges, calculating the boundary strength, deciding whether to turn on or off a filter, and selecting a strength of the filter. Additional features relating to the method 1700 for video processing can be found at Example 8 discussed above.

Figure 18:
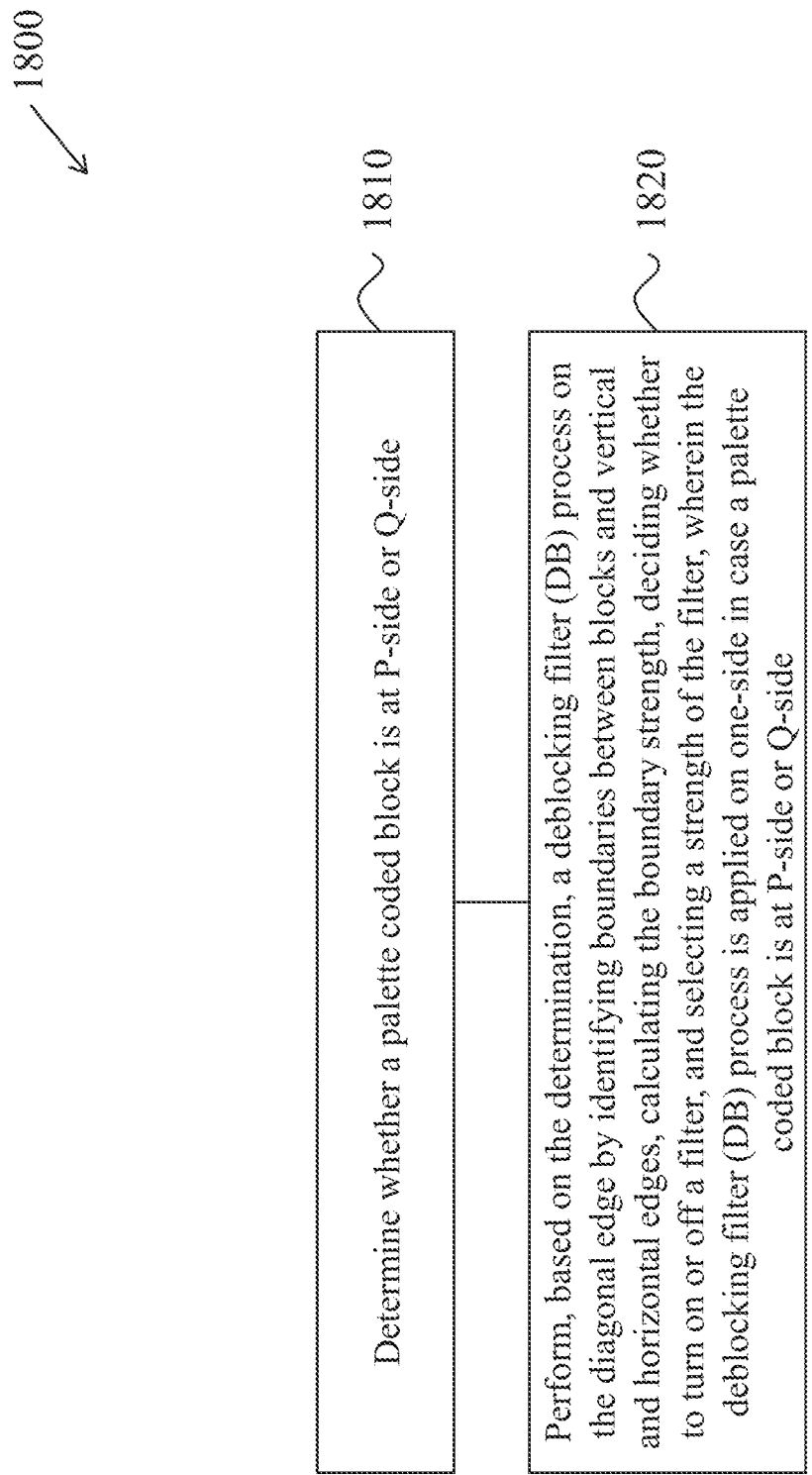
FIG. 18 shows a flowchart of example methods for video processing based on some embodiments of the present disclosure.

FIG. 18 shows a flowchart of another example method 1800 for video processing based on some embodiments of the present disclosure. The method 1800 for video processing includes, at step 1810, determining whether a palette coded block is at P-side or Q-side, and, at step 1820, performing, based on the determination, a deblocking filter (DB) process on the diagonal edge by identifying boundaries between blocks and vertical and horizontal edges, calculating the boundary strength, deciding whether to turn on or off a filter, and selecting a strength of the filter. The deblocking filter (DB) process is applied on one-side in case a palette coded block is at P-side or Q-side. Additional features relating to the method 1800 for video processing can be found at Example 9 discussed above.

Figure 19:
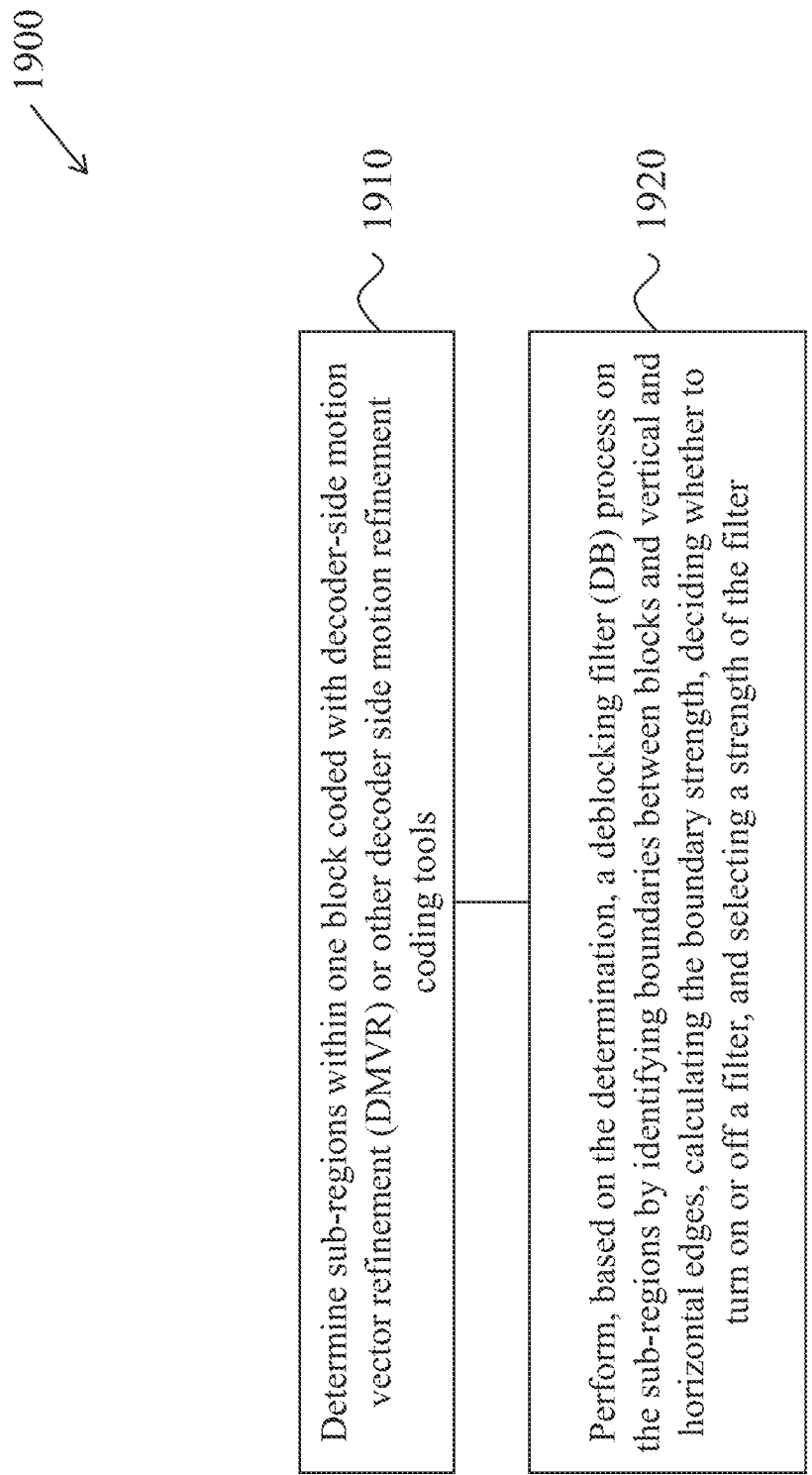
FIG. 19 shows a flowchart of example methods for video processing based on some embodiments of the present disclosure.

FIG. 19 shows a flowchart of another example method 1900 for video processing based on some embodiments of the present disclosure. The method 1900 for video processing includes, at step 1910, determining sub-regions within one block coded with decoder-side motion vector refinement (DMVR) or other decoder side motion refinement coding tools, and, at step 1920, performing, based on the determination, a deblocking filter (DB) process on the sub-regions by identifying boundaries between blocks and vertical and horizontal edges, calculating the boundary strength, deciding whether to turn on or off a filter, and selecting a strength of the filter. Additional features relating to the method 1900 for video processing can be found at Example 10 discussed above.

Figure 20:
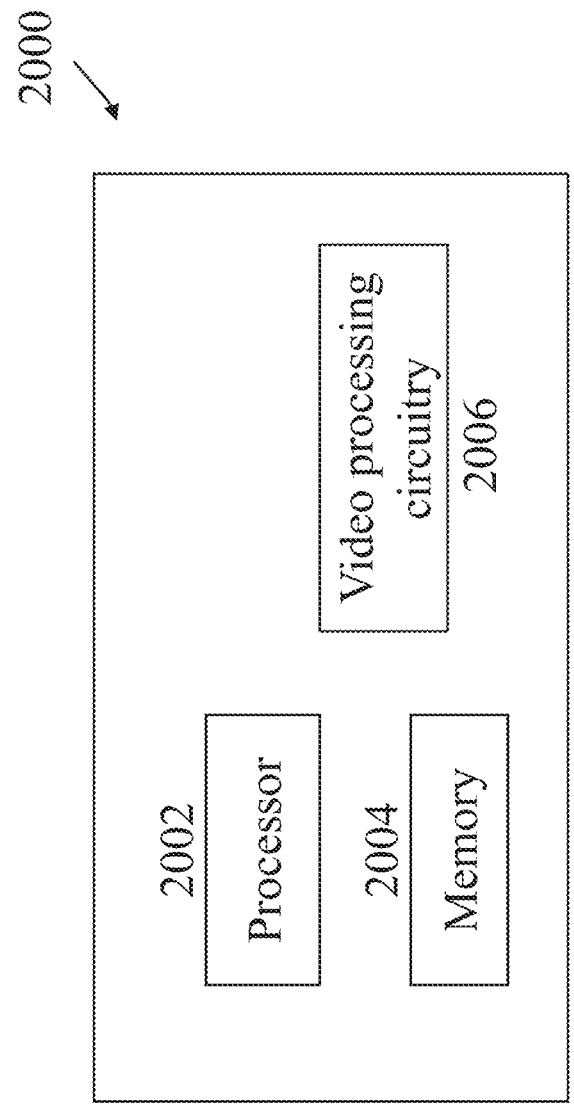
FIG. 20 is a block diagram of an example of a hardware platform for implementing a visual media decoding or a visual media encoding technique according to embodiments of the present disclosure.

FIG. 20 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing circuitry 2006. The processor(s) 2002 may be configured to implement one or more methods (including, but not limited to, methods 1200-1900) described in the present document. The memory (memories) 2004 may be used for storing data and code used for implementing the methods and techniques described herein. The video processing circuitry 2006 may be used to implement, in hardware circuitry, some techniques described in the present document.

In some embodiments, the video coding methods may be implemented using an apparatus that is implemented on a hardware platform as described with respect to FIG. 20.

Figure 21:
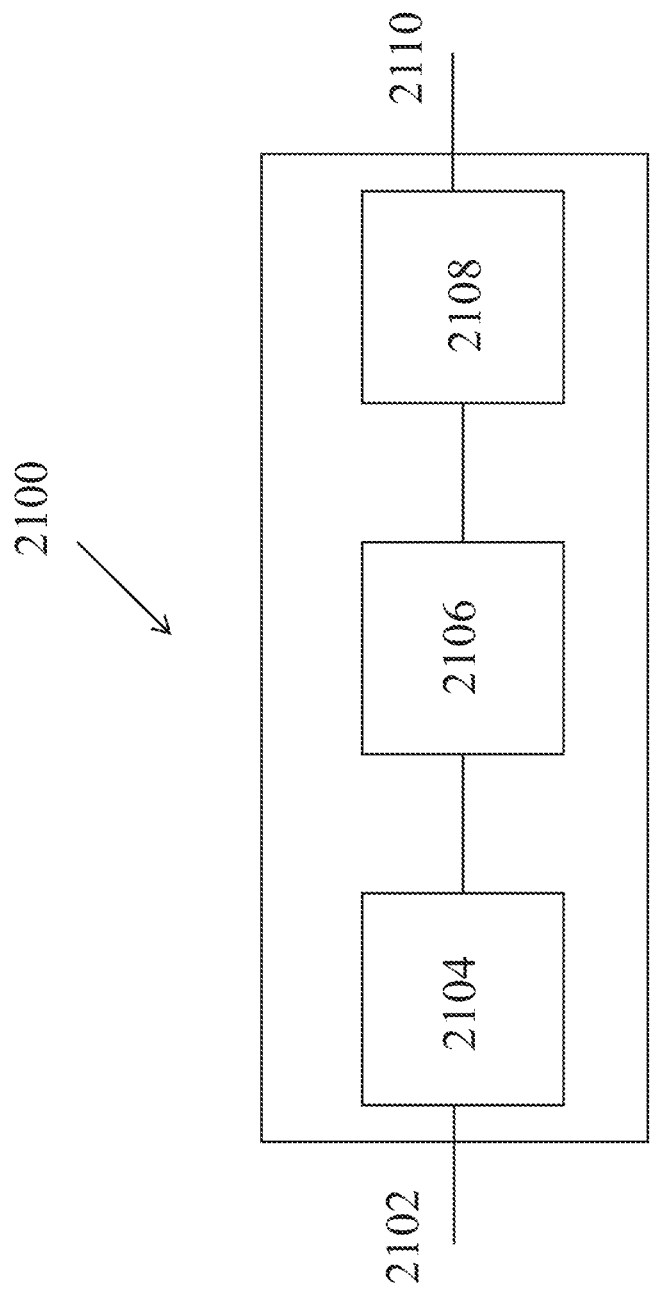
FIG. 21 is a block diagram of an example video processing system in which disclosed embodiments may be implemented.

FIG. 21 is a block diagram showing an example video processing system 2100 in which various techniques disclosed herein may be implemented. Various implementations may include some or all of the components of the system 2100. The system 2100 may include input 2102 for receiving video content. The video content may be received in a raw or uncompressed format, e.g., 8 or 10 bit multi-component pixel values, or may be in a compressed or encoded format. The input 2102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2100 may include a coding component 2104 that may implement the various coding or encoding methods described in the present document. The coding component 2104 may reduce the average bitrate of video from the input 2102 to the output of the coding component 2104 to produce a coded representation of the video. The coding techniques are therefore sometimes called video compression or video transcoding techniques. The output of the coding component 2104 may be either stored, or transmitted via a communication connected, as represented by the component 2106. The stored or communicated bitstream (or coded) representation of the video received at the input 2102 may be used by the component 2108 for generating pixel values or displayable video that is sent to a display interface 2110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The techniques described in the present document may be embodied in various electronic devices such as mobile phones, laptops, smartphones or other devices that are capable of performing digital data processing and/or video display.

Figure 22:
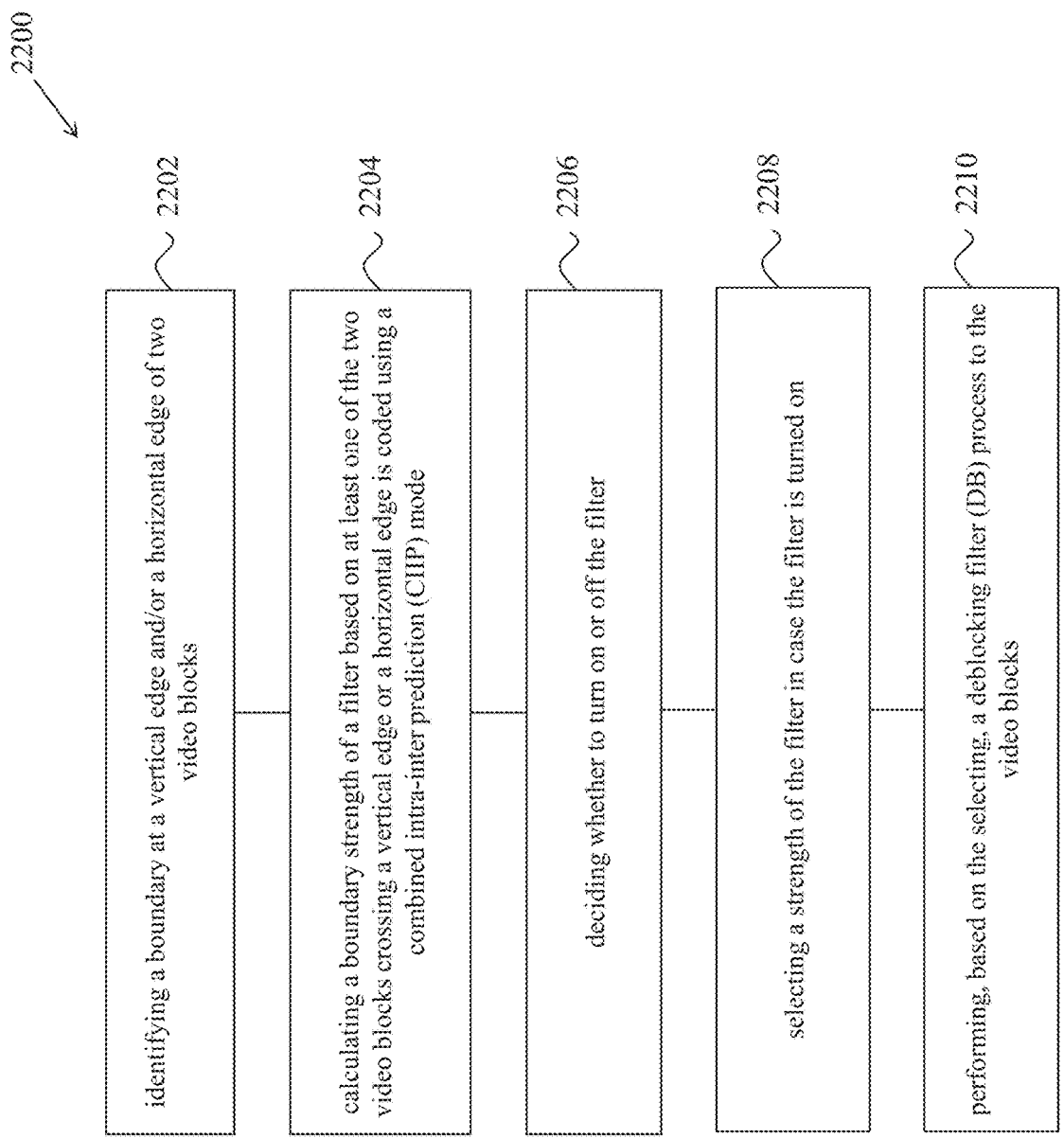
FIG. 22 shows a flowchart of an example method for visual media processing.

FIG. 22 shows a flowchart of an example method 2200 for visual media processing. Steps of this flowchart are discussed in connection with Example 4 in Section 12 of this document. At step 2202, the process identifies a boundary at a vertical edge and/or a horizontal edge of two video blocks. At step 2204, the process calculates a boundary strength of a filter based on at least one of the two video blocks crossing a vertical edge or a horizontal edge is coded using a combined intra-inter prediction (CIIP) mode. At step 2206, the process decides whether to turn on or off the filter. At step 2208, the process selects a strength of the filter in case the filter is turned on. At step 2210, the process performs, based on the selecting, a deblocking filter (DB) process to the video blocks.

Figure 23:
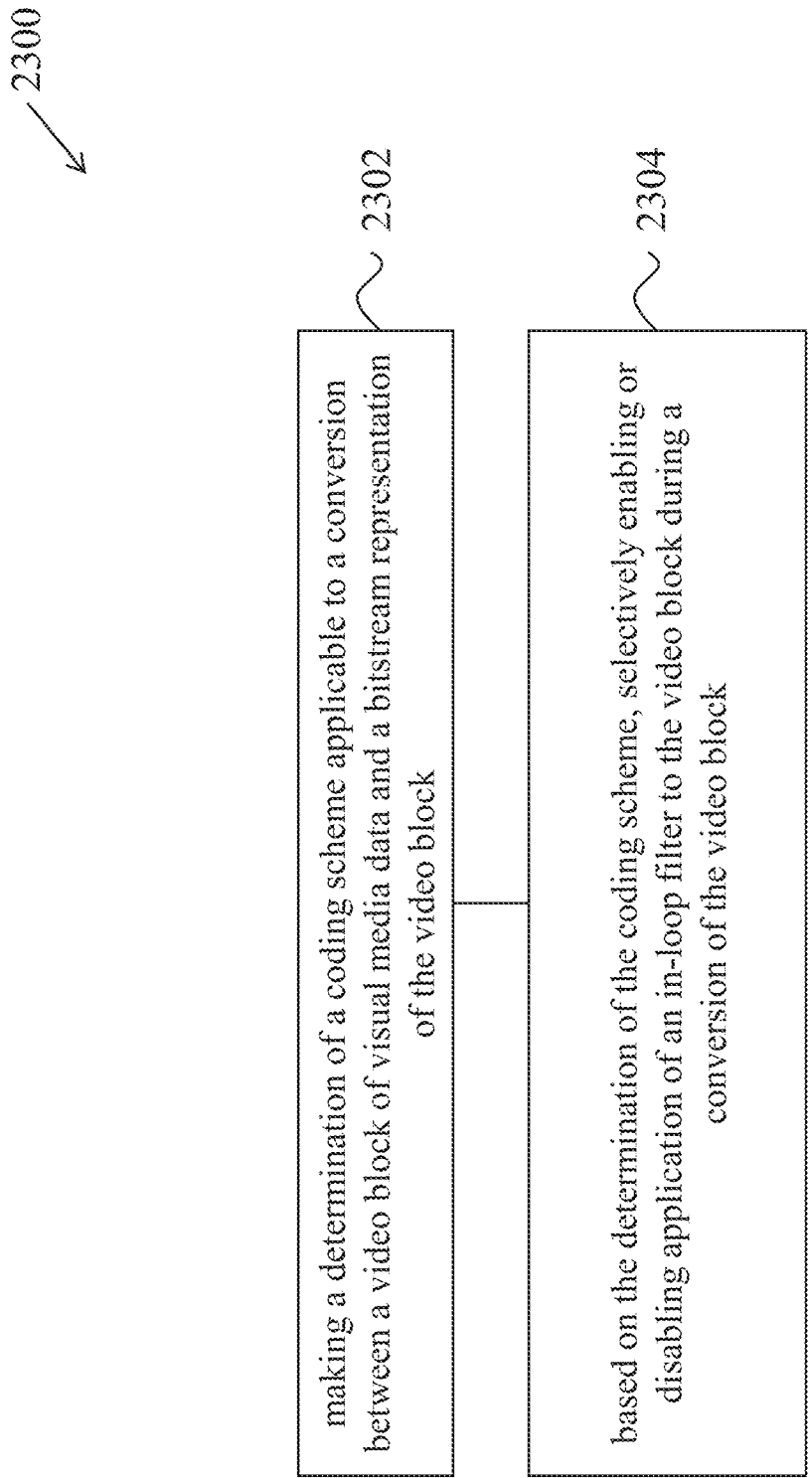
FIG. 23 shows a flowchart of an example method for visual media processing.

FIG. 23 shows a flowchart of an example method 2300 for visual media processing. Steps of this flowchart are discussed in connection with Example 1 in Section 12 of this document. At step 2302, the process makes a determination of a coding scheme applicable to a conversion between a video block of visual media data and a bitstream representation of the video block. Based on the determination of the coding scheme, at step 2304, the process selectively enables or disables application of an in-loop filter to the video block during a conversion of the video block.

Figure 24:
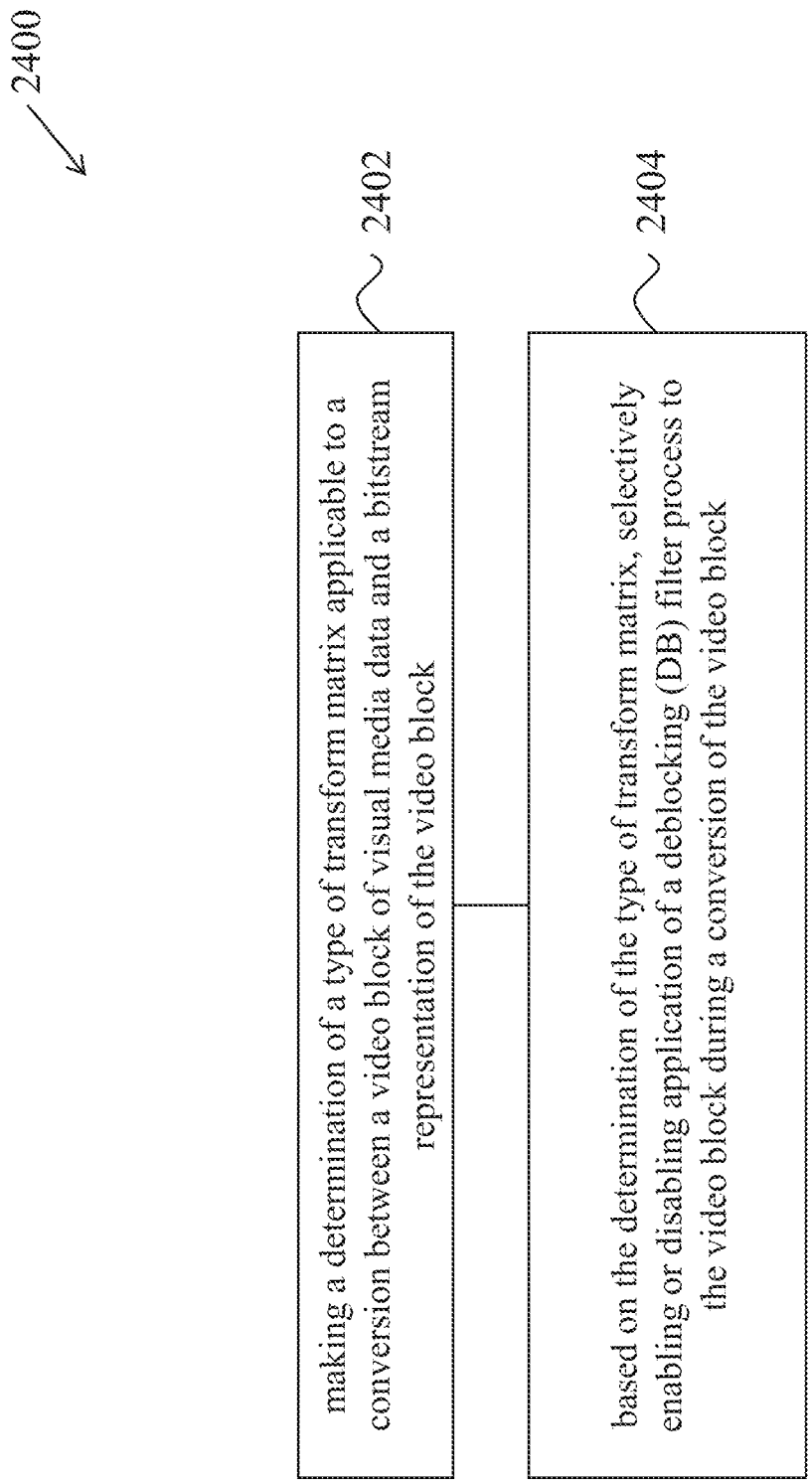
FIG. 24 shows a flowchart of an example method for visual media processing.

FIG. 24 shows a flowchart of an example method 2400 for visual media processing. Steps of this flowchart are discussed in connection with Example 2 in Section 12 of this document. At step 2402, the process makes a determination of a type of transform matrix applicable to a conversion between a video block of visual media data and a bitstream representation of the video block. Based on the determination of the type of transform matrix, at step 2404, the process selectively enables or disables application of a deblocking (DB) filter process to the video block during a conversion of the video block.

Figure 25:
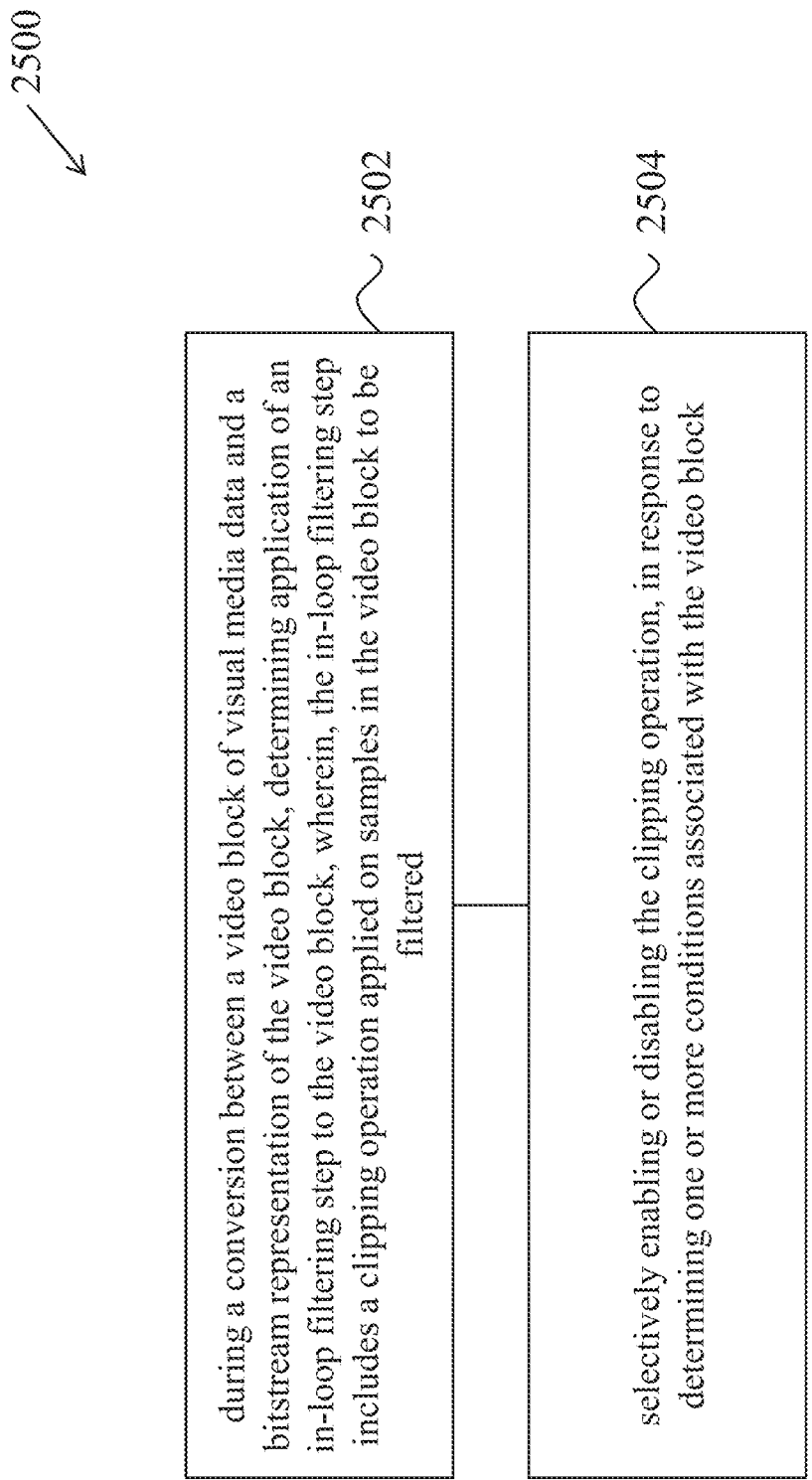
FIG. 25 shows a flowchart of an example method for visual media processing.

FIG. 25 shows a flowchart of an example method 2500 for visual media processing. Steps of this flowchart are discussed in connection with Example 3 in Section 12 of this document. At step 2502, during a conversion between a video block of visual media data and a bitstream representation of the video block, the process determines application of an in-loop filtering step to the video block, wherein, the in-loop filtering step includes a clipping operation applied on samples in the video block to be filtered. At step 2504, the process selectively enables or disables the clipping operation, in response to determining one or more conditions associated with the video block.

Some embodiments disclosed herein are now presented in clause-based format.

X1. A method for visual media processing, comprising:
identifying a boundary at a vertical edge and/or a horizontal edge of two video blocks;
calculating a boundary strength of a filter based on at least one of the two video blocks crossing a vertical edge or a horizontal edge is coded using a combined intra-inter prediction (CIIP) mode;
deciding whether to turn on or off the filter;
selecting a strength of the filter in case the filter is turned on; and
performing, based on the selecting, a deblocking filter (DB) process to the video blocks.

X2. The method of clause X1, wherein a CIIP coded block is treated as an intra coded block in calculating the boundary strength.

X3. The method of clause X1, wherein the boundary strength is selected as 2 in case at least one of two video blocks crossing a vertical or horizontal edge is coded with CIIP.

X4. The method of clause X1, wherein the boundary strength is selected as 1 in case only one of two blocks crossing a vertical or horizontal edge is coded with CIIP and the other video block is inter coded.

X5. The method of clause X1, wherein the boundary strength is selected as 1 in case only one of two blocks crossing the edge is coded with CIIP and the other video block is inter or intra block copy (IBC) coded.

A1. A method for visual media processing, comprising:
making a determination of a coding scheme applicable to a conversion between a video block of visual media data and a bitstream representation of the video block; and
based on the determination of the coding scheme, selectively enabling or disabling application of an in-loop filter to the video block during a conversion of the video block.

A2. The method of clause A1, wherein the in-loop filter include one of: a deblocking filter (DB), a sample adaptive offset (SAO) filter, and/or an adaptive loop filter (ALF).

A3. The method of any one or more of clauses A1-A2, wherein the coding scheme includes usage of an optical flow to refine prediction samples and/or motion information and/or reconstructed samples.

A4. The method of clause A3, wherein the coding scheme that uses the optical flow to refine the prediction samples includes a bi-directional optical flow (BDOF).

A5. The method of clause A4, wherein the determination of the coding scheme includes identifying whether the prediction samples are located within the bi-directional optical flow (BDOF), and wherein the application of the in-loop filter is disabled in response to determining that the prediction samples are located within the bi-directional optical flow (BDOF).

A6. The method of clause A5, wherein at least one of a boundary strength and/or a filter strength of the in-loop filter is determined based on usage of the bi-directional optical flow (BDOF).

A7. The method of clause A4, wherein the determination of the coding scheme includes identifying whether the prediction samples are located within the bi-directional optical flow (BDOF), and wherein the application of the in-loop filter is enabled in response to determining that the prediction samples are located within the bi-directional optical flow (BDOF), and further wherein the in-loop filter has a weaker strength than another in-loop filter associated with prediction samples that are not located within the BDOF.

B1. A method for visual media processing, comprising:
making a determination of a type of transform matrix applicable to a conversion between a video block of visual media data and a bitstream representation of the video block; and
based on the determination of the type of transform matrix, selectively enabling or disabling application of a deblocking (DB) filter process to the video block during a conversion of the video block.

B2. The method of clause B1, wherein the type of transform matrix includes DCT-II, DST-VII, DCT-VIII, and/or transform skip mode.

B3. The method of any one or more of clauses B1-B2, wherein the application of the deblocking filtering process further includes a clipping operation.

B4. The method of clause B3, wherein the clipping operation is position-dependent based on positions of samples in the video block with respect to the DB filter.

B5. The method of clause B4, wherein the clipping operation is disabled for samples located in transform skip-coded video blocks.

B6. The method of clause B5, wherein the deblocking filter (DB) process is disabled on the transform skip-coded blocks, or upon a determination that the video block coding is exempt from a transform-based coding technique.

B7. The method of clause B6, wherein the transform-based coding technique includes a residue differential pulse-code modulation (RDPCM) or a quantized residue differential pulse-code modulation (QR-BDPCM).

B8. The method of clause B3, wherein, if the DB filter process is enabled on a set of samples, all samples included in the set are subjected to same parameters of the clipping operation.

B9. The method of clause B4, wherein parameters of position-dependent clipping operation are related to basis functions of a transform matrix applicable to the conversion.

C1. A method for visual media processing, comprising:
during a conversion between a video block of visual media data and a bitstream representation of the video block, determining application of an in-loop filtering step to the video block, wherein, the in-loop filtering step includes a clipping operation applied on samples in the video block to be filtered; and
selectively enabling or disabling the clipping operation, in response to determining one or more conditions associated with the video block.

C2. The method of clause C1, wherein the one or more conditions associated with the video block include:
(a) contents of the video block, or
(b) a field included in a sequence parameter set (SPS)/a video parameter set (VPS)/picture parameter set (PPS)/picture header/slice header/tile group header/largest coding unit (LCU)/coding unit (CU)/LCU row/group of LCUs.

C3. The method of any one or more of clauses X1-C2, wherein the conversion includes generating the bitstream representation from a video block.

C4. The method of any one or more of clauses X1-C2, wherein the conversion includes generating pixel values of a video block from the bitstream representation.

C5. A video encoder apparatus comprising a processor configured to implement a method recited in any one or more of clauses X1-C2.

C6. A video decoder apparatus comprising a processor configured to implement a method recited in any one or more of clauses X1-C2.

C7. A computer readable medium having code stored thereon, the code embodying processor-executable instructions for implementing a method recited in any one or more of clauses X1-C2.

In the present document, the term "video processing" or "visual media processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a block may be encoded in terms of transformed and coded error residual values and also using bits in headers and other fields in the bitstream. Herein, a block may be a grouping of pixels according to the operation being performed such as a coding unit, or a prediction unit or a transform unit and so on. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

From the foregoing, it will be appreciated that specific embodiments of the present disclosure have been described herein for purposes of illustration, but that various modifications may be made without deviating from the scope of the invention. Accordingly, the presently disclosed embodiments are not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electronically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   identifying, for a deblocking filtering process to two video blocks of a video during a conversion between the two video blocks and a bitstream of the video, a boundary at a vertical edge and/or a horizontal edge of the two video blocks;
   determining a boundary strength of the boundary;
   deciding whether to turn on or off a filter for the boundary based on the boundary strength;
   selecting a strength of the filter in case the filter is turned on; and
   performing the conversion based on the selecting,
   wherein the boundary strength is equal to 2 in case that at least one of the two video blocks crossing the vertical edge or the horizontal edge is coded using a combined inter-intra prediction mode,
   wherein in the combined inter-intra prediction mode, a prediction signal of the at least one of the two video blocks is generated at least based on an intra prediction signal and an inter prediction signal, and
   wherein the boundary strength is determined based on whether an absolute difference between a horizontal or vertical component of block vectors used in a prediction of the two video blocks is greater than or equal to a threshold in case that both the two video blocks are coded using an intra block copy prediction mode, wherein the threshold is a non-integer.

2. The method of claim 1, wherein the boundary is at least one of a transform subblock boundary, a coding unit boundary, or a prediction subblock boundary.

3. The method of claim 2, wherein the prediction subblock boundary includes a prediction unit boundary introduced by a subblock-based temporal motion vector predictor mode or an affine motion compensation mode.

4. The method of claim 3, wherein the deblocking filtering process is applied on an 8×8 grid for the prediction subblock boundary.

5. The method of claim 1, wherein the boundary strength is determined based on whether different reference pictures or a different number of motion vectors are used in a prediction of the two video blocks.

6. The method of claim 1, wherein a stronger deblocking filter is used in the deblocking filtering process when samples at either one side of the boundary belong to a large block, where a sample belonging to the large block is defined as when width is larger than or equal to 32 for the vertical edge, and when height is larger than or equal to 32 for the horizontal edge.

7. The method of claim 6, wherein the stronger deblocking filter is a bilinear filter.

8. The method of claim 1, wherein the conversion includes encoding the two video blocks into the bitstream.

9. The method of claim 1, wherein the conversion includes decoding the two video blocks from the bitstream.

10. An apparatus for processing video data comprising a processor and a non-transitory memory with instructions thereon, wherein the instructions upon execution by the processor, cause the processor to:
    identify, for a deblocking filtering process to two video blocks of a video during a conversion between the two video blocks and a bitstream of the video, a boundary at a vertical edge and/or a horizontal edge of the two video blocks;
    determine a boundary strength of the boundary;
    decide whether to turn on or off a filter for the boundary based on the boundary strength;
    select a strength of the filter in case the filter is turned on; and
    perform the conversion based on the selecting,
    wherein the boundary strength is equal to 2 in case that at least one of the two video blocks crossing the vertical edge or the horizontal edge is coded using a combined inter-intra prediction mode,
    wherein in the combined inter-intra prediction mode, a prediction signal of the at least one of the two video blocks is generated at least based on an intra prediction signal and an inter prediction signal, and
    wherein the boundary strength is determined based on whether an absolute difference between a horizontal or vertical component of block vectors used in a prediction of the two video blocks is greater than or equal to a threshold in case that both the two video blocks are coded using an intra block copy prediction mode, wherein the threshold is a non-integer.

11. The apparatus of claim 10, wherein the boundary is at least one of a transform subblock boundary, a coding unit boundary, or a prediction subblock boundary, and
wherein the prediction subblock boundary includes a prediction unit boundary introduced by a subblock-based temporal motion vector predictor mode or an affine motion compensation mode.

12. The apparatus of claim 11, wherein the deblocking filtering process is applied on an 8×8 grid for the prediction subblock boundary.

13. The apparatus of claim 10, wherein the boundary strength is determined based on whether different reference pictures or a different number of motion vectors are used in a prediction of the two video blocks.

14. The apparatus of claim 10, wherein a stronger deblocking filter is used in the deblocking filtering process when samples at either one side of the boundary belong to a large block, where a sample belonging to the large block is defined as when width is larger than or equal to 32 for the vertical edge, and when height is larger than or equal to 32 for the horizontal edge.

15. The apparatus of claim 14, wherein the stronger deblocking filter is a bilinear filter.

16. A non-transitory computer-readable storage medium storing instructions that cause a processor to:
identify, for a deblocking filtering process to two video blocks of a video during a conversion between the two video blocks and a bitstream of the video, a boundary at a vertical edge and/or a horizontal edge of the two video blocks;
determine a boundary strength of the boundary;
decide whether to turn on or off a filter for the boundary based on the boundary strength;
select a strength of the filter in case the filter is turned on; and
perform the conversion based on the selecting,
wherein the boundary strength is equal to 2 in case that at least one of the two video blocks crossing the vertical edge or the horizontal edge is coded using a combined inter-intra prediction mode,
wherein in the combined inter-intra prediction mode, a prediction signal of the at least one of the two video blocks is generated at least based on an intra prediction signal and an inter prediction signal, and
wherein the boundary strength is determined based on whether an absolute difference between a horizontal or vertical component of block vectors used in a prediction of the two video blocks is greater than or equal to a threshold in case that both the two video blocks are coded using an intra block copy prediction mode, wherein the threshold is a non-integer.

17. The non-transitory computer-readable storage medium of claim 16, wherein the boundary is at least one of a transform subblock boundary, a coding unit boundary, or a prediction subblock boundary, and
wherein the prediction subblock boundary includes a prediction unit boundary introduced by a subblock-based temporal motion vector predictor mode or an affine motion compensation mode.

18. The non-transitory computer-readable recording medium of claim 17, wherein the deblocking filtering process is applied on an 8×8 grid for the prediction subblock boundary.

19. A method for storing a bitstream of a video, comprising:
identifying, for a deblocking filtering process to two video blocks of the video, a boundary at a vertical edge and/or a horizontal edge of the two video blocks;
determining a boundary strength of the boundary;
deciding whether to turn on or off a filter for the boundary based on the boundary strength;
selecting a strength of the filter in case the filter is turned on;
generating the bitstream based on the selecting; and
storing the bitstream in a non-transitory computer-readable recording medium,
wherein the boundary strength is equal to 2 in case that at least one of the two video blocks crossing the vertical edge or the horizontal edge is coded using a combined inter-intra prediction mode, and
wherein in the combined inter-intra prediction mode, a prediction signal of the at least one of the two video blocks is generated at least based on an intra prediction signal and an inter prediction signal, and
wherein the boundary strength is determined based on whether an absolute difference between a horizontal or vertical component of block vectors used in a prediction of the two video blocks is greater than or equal to a threshold in case that both the two video blocks are coded using an intra block copy prediction mode, wherein the threshold is a non-integer.

20. The method of claim 19, wherein the boundary is at least one of a transform subblock boundary, a coding unit boundary, or a prediction subblock boundary, and
wherein the prediction subblock boundary includes a prediction unit boundary introduced by a subblock-based temporal motion vector predictor mode or an affine motion compensation mode.

\* \* \* \* \*